(12) United States Patent
Tani et al.

(10) Patent No.: US 8,204,640 B2
(45) Date of Patent: Jun. 19, 2012

(54) VEHICLE DRIVE POWER GENERATION CONTROL APPARATUS

(75) Inventors: Keisuke Tani, Kariya (JP); Akira Sakamoto, Kariya (JP); Tadashi Sakai, Kariya (JP)

(73) Assignee: Denso Corporation, Kariya (JP)

( * ) Notice: Subject to any disclaimer, the term of this patent is extended or adjusted under 35 U.S.C. 154(b) by 390 days.

(21) Appl. No.: 12/685,067

(22) Filed: Jan. 11, 2010

(65) Prior Publication Data
US 2010/0179714 A1 Jul. 15, 2010

(30) Foreign Application Priority Data

Jan. 13, 2009 (JP) .................................. 2009-5074

(51) Int. Cl.
*B60W 20/00* (2006.01)
*B60W 10/04* (2006.01)
*B60W 10/26* (2006.01)
*G06F 19/00* (2011.01)

(52) U.S. Cl. ....... 701/22; 701/99; 701/123; 180/65.265; 180/65.28; 180/65.285; 180/65.29

(58) Field of Classification Search ................... 701/22, 701/99, 123, 1; 903/902, 903, 904, 930; 180/65.21, 65.3, 65.225, 65.26, 65.265, 65.27, 180/65.28, 65.285, 65.29
See application file for complete search history.

(56) References Cited

U.S. PATENT DOCUMENTS

| | | | |
|---|---|---|---|
| 6,201,312 B1 * | 3/2001 | Shioiri et al. | 290/40 C |
| 7,360,615 B2 * | 4/2008 | Salman et al. | 180/65.265 |
| 7,633,247 B2 | 12/2009 | Obayashi | |
| 2002/0107618 A1 * | 8/2002 | Deguchi et al. | 701/22 |
| 2009/0259355 A1 * | 10/2009 | Li | 701/22 |

FOREIGN PATENT DOCUMENTS

| | | |
|---|---|---|
| JP | 2004-166392 | 6/2004 |
| JP | 3610879 | 10/2004 |
| JP | 2007-176270 | 7/2007 |
| JP | 2008-183937 | 8/2008 |

OTHER PUBLICATIONS

JP2008-183937, published 8-2008, machine generated English translation, pp. 1-21.*

* cited by examiner

*Primary Examiner* — Thomas G. Black
*Assistant Examiner* — Christine Behncke
(74) *Attorney, Agent, or Firm* — Nixon & Vanderhye PC

(57) ABSTRACT

Past limit electric power generation costs and past limit electric assist costs are stored as pieces of planning information, based on each of which a fuel consumption amount is estimated assuming that a vehicle travels according to a past traveling pattern. An average estimated fuel consumption amount is computed by averaging the fuel consumption amounts estimated for the pieces of planning information. The piece of planning information including the lowest average estimated fuel consumption amount is selected for the next traveling. An improvement amount during electric power generation and an improvement amount during assistance are computed based on the selected piece of planning information (limit electric power generation cost), the limit electric assist cost, and the present generating and electric assist costs required actually while the vehicle is traveling. An engine and a motor/generator of the vehicle are controlled based on the two improvement amounts.

7 Claims, 19 Drawing Sheets

FIG. 16

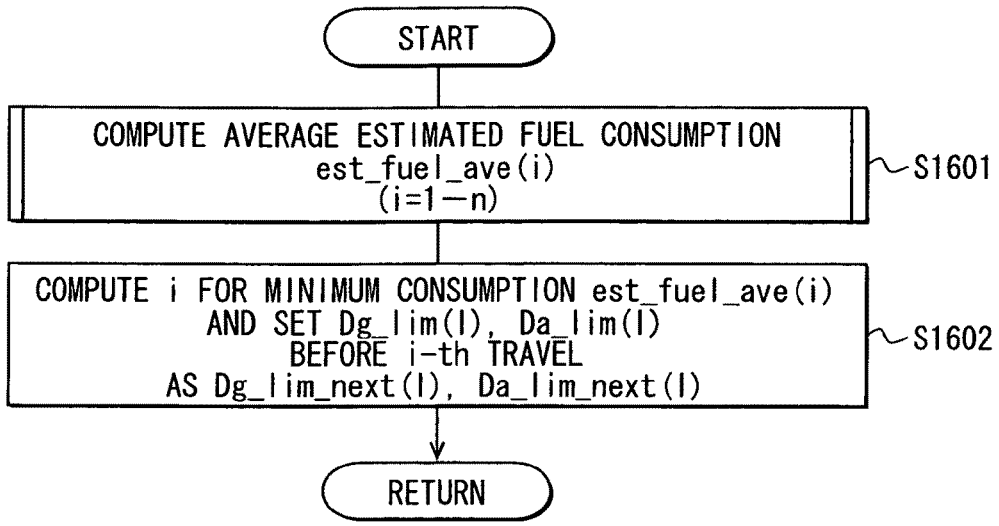

FIG. 17

TRAVEL j : TRAVEL PATTERN BEFORE j-th TRAVEL

NEW ←――――――――――――――→ OLD

| TRAVEL<br>PLAN | TRAVEL 1 | TRAVEL 2 | TRAVEL n−1 | TRAVEL n | AVERAGE |
|---|---|---|---|---|---|
| PLAN 1 | est_fuel<br>(1, 1) | est_fuel<br>(1, 2) | est_fuel<br>(1, n−1) | est_fuel<br>(1, n) | est_fuel_ave<br>(1) |
| PLAN 2 | est_fuel<br>(2, 1) | est_fuel<br>(2, 2) | est_fuel<br>(2, n−1) | est_fuel<br>(2, n) | est_fuel_ave<br>(2) |
| PLAN n−1 | est_fuel<br>(n−1, 1) | est_fuel<br>(n−2, 2) | est_fuel<br>(n−1, n−1) | est_fuel<br>(n−1, n) | est_fuel_ave<br>(n−1) |
| PLAN n | est_fuel<br>(n, 1) | est_fuel<br>(n, 2) | est_fuel<br>(n, n−1) | est_fuel<br>(n, n) | est_fuel_ave<br>(n) |

NEW ↑ ↓ OLD

VEHICLE DRIVE POWER GENERATION CONTROL APPARATUS

CROSS REFERENCE TO RELATED APPLICATION

This patent application is based on and incorporates herein by reference Japanese Patent Application No. 2009-5074 filed on Jan. 13, 2009.

FIELD OF THE INVENTION

The present invention relates to a vehicle drive power generation control apparatus for controlling the drive power generator of a hybrid vehicle.

BACKGROUND OF THE INVENTION

A hybrid vehicle having an internal combustion engine, a rotary electric machine, and an electric charge storage device is known. The engine and the rotary electric machine are the drive power generators that generate drive power for driving the drive shaft of the vehicle. The electric charge storage device supplies the rotary electric machine with electric power for rotating the machine.

Because a hybrid vehicle has two types of drive power generators, it is possible to improve the fuel consumption rate of the vehicle by properly transferring the drive power generated by the generators. Therefore, the drive power transfer for the two types of drive power generators is important. By way of example, the drive power transfer may be determined by using the travel route set by a navigation unit disclosed in Patent Document 1 (Japanese Patent No. 3,610,879).

In Patent Document 1, while the vehicle is traveling actually along a travel route, charge and discharge control of a battery is so performed as to satisfy a target charging rate based on a predicted traveling pattern. However, not all the actual traveling patterns during the traveling are the same as the predicted patterns. As a result; the battery charging time point and the battery discharging time point may not be optimal. For example, even when electric power is generated at the time point at which the electric power generation efficiency is predicted to be high, the electric power generation may occur actually when the electric power generation efficiency is low.

In Patent Document 2 (JP 2008-183937 A), a proposed travel route for a vehicle and the drive power for the route are predicted. The proposed travel route is divided into sections. For each of the route sections, an electric power generation cost is computed as an index of the fuel increase caused by the electric power generation when the vehicle travels in an electric power generation mode. Likewise, for each of the route sections, an electric assist cost is computed as an index of the fuel decrease caused by the drive power assistance of the rotary electric machine of the vehicle when the vehicle travels in a drive power assist mode. Based on the electric power generation cost and the electric assist cost, an electric power generation cost reference value and an electric assist cost reference value are set as references for the electric power generation cost and the electric assist cost, respectively. An actual electric power generation cost and an actual electric assist cost are computed from the actual demanded drive power demanded by the axel of the vehicle, etc. While the vehicle is traveling, the drive power generated by the internal combustion engine of the vehicle and the electric power generated by the rotary electric machine or the assist electric power from the machine are controlled based on the actual electric power generation cost and the electric assist cost, the electric power generation cost reference value, and the electric assist cost reference value.

In Patent Document 2, the electric power generation and the assistance are controlled based on the electric power generation cost reference value and the electric assist cost reference value. This can avoid the problem with Patent Document 1 that charging and discharging time point deviations may cause inefficient electric power generation and drive power assistance. However, in the invention of Patent Document 2, only one future traveling pattern is predicted, and the electric power generation cost reference value and the electric assist cost reference value are set based on the pattern. As a result, when the speed of the vehicle and the drive power vary greatly when the vehicle travels at different times along the travel route, the set value of the electric power generation or the assist electric power is not always the optimum value, so that it may not be possible to sufficiently improve the fuel consumption rate.

SUMMARY OF THE INVENTION

It is an object of the present invention to provide a drive power generation control apparatus that can further improve the fuel consumption rate of a hybrid vehicle.

A drive power generation control apparatus according to the present invention for a hybrid vehicle has an internal combustion engine and a rotary electric machine as drive power generators for generating drive power for driving a drive shaft of the vehicle. The control apparatus further has an electric power storage device for supplying electric power to and receiving electric power from the rotary electric machine.

The drive power generation control apparatus sets a proposed travel route for the vehicle and a predicted drive power for the vehicle traveling along the route; divides the set route into a plurality of first sections; computes, for each of the plurality of first sections, an electric power generation cost as an index of the fuel increase caused by electric power generation when the vehicle travels in an electric power generation mode; computes, for each of the plurality of first sections, an electric assist cost as an index of the fuel decrease caused by drive power assistance by the rotary electric machine when the vehicle travels in a drive power assist mode; sets, based on the electric power generation cost and the electric assist cost computed for the plurality of first sections, an electric power generation cost reference value and an electric assist cost reference value respectively as references for the electric power generation cost and the electric assist cost, respectively; sequentially sets, as actual demanded drive power, a drive power demanded by the drive shaft while the vehicle is traveling; computes, as an actual electric power generation cost, an electric power generation cost required when the vehicle travels in the electric power generation mode so that the actual demanded drive power is satisfied; computes, as an actual electric assist cost, the electric assist cost required when the vehicle travels in the drive power assist mode so that the actual demanded drive power is satisfied; determines, from the actual electric power generation cost and the electric power generation cost reference value, a cost improvement amount achieved when the vehicle travels in the electric power generation mode; determines, from the actual electric assist cost and the electric assist cost reference value, a cost improvement amount achieved when the vehicle travels in the drive power assist mode; controls, based on the two amounts of cost improvement, the drive power generated by the internal combustion engine; and controls the rotation of or the electric power generation by the rotary electric machine.

In addition, the drive power generation control apparatus stores, as pieces of planning information, set past electric power generation cost reference values and electric assist cost reference values; computes a performance index of the fuel consumption amount estimated on the assumption that the vehicle travels along the proposed travel route, with the internal combustion engine and the rotary electric machine controlled based on each of the pieces of planning information stored about the route; selects, based on the computed performance index, the piece of planning information including the fuel consumption amount estimated to be lowest, from the pieces of planning information stored about the proposed travel route; and performs control with the electric power generation cost reference value and the electric assist cost reference value as parts of the selected piece of planning information.

BRIEF DESCRIPTION OF THE DRAWINGS

The above and other objects, features and advantages of the present invention will become more apparent from the following detailed description made with reference to the accompanying drawings, in which:

FIG. 16 is a flowchart showing details of step S312 in FIG. 3;

FIG. 17 is a table showing a method for computing an average estimated fuel consumption at step S1601 in FIG. 16;

DETAILED DESCRIPTION OF THE EMBODIMENT

An embodiment of the present invention will be described below with reference to the accompanying drawings.

Figure 1:
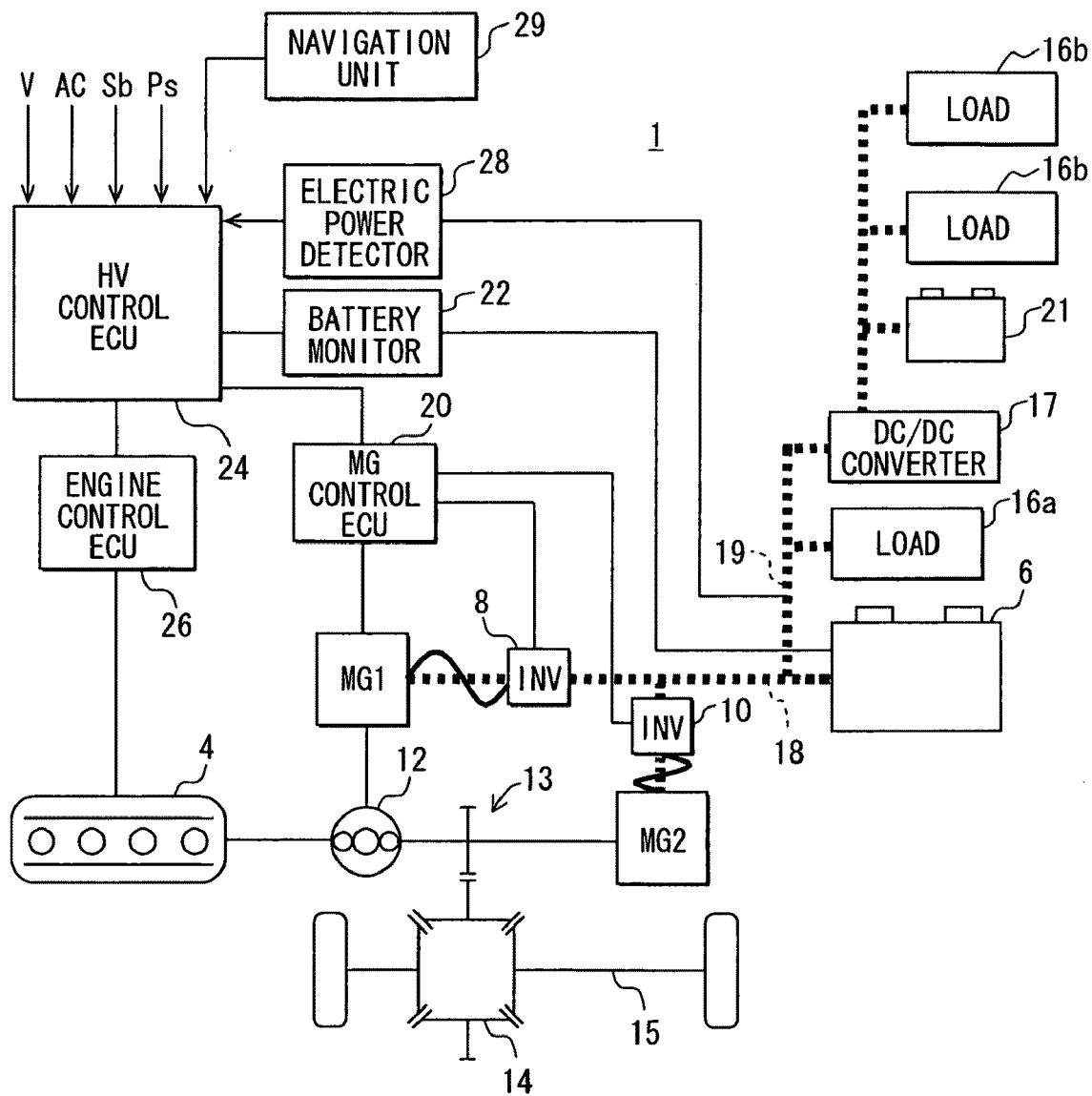
FIG. 1 is a schematic diagram showing the structure of principal parts of a hybrid vehicle having a drive power generation control apparatus according to an embodiment of the present invention, which is constructed of a hybrid control ECU and a navigation unit.

As shown in FIG. 1, a series-parallel hybrid vehicle 1 has an engine 4 and two motor/generators (rotary electric machines) MG1 and MG2 as drive power generators.

The engine 4 is an internal combustion engine that burns gasoline or diesel oil. The output shaft of the engine 4 is coupled to a planetary gear of a planetary gear train 12. The output shaft of the first motor/generator MG1 is coupled to the sun gear of the planetary gear train 12. The input shaft of a speed reducer 13 is coupled to the ring gear of the planetary gear train 12. The output shaft of the second motor/generator MG2 is also coupled to the input shaft of the speed reducer 13. The speed reducer 13 includes a pair of normally meshing gears. The rotation of the output shaft of the speed reducer 13 is transmitted through differential gears 14 to an axle (drive shaft) 15. This structure makes the planetary gear train 12 function as a drive power divider. The planetary gear train 12 can integrate the drive power from the engine 4 and the drive power from the second motor/generator MG2, input the integrated power to the input shaft of the speed reducer 13, and divide the drive power from the engine 4 for the input shaft of the reducer 13 and the first motor/generator MG1.

The motor/generators MG1 and MG2 are connected to a first inverter 8 and a second inverter 10, respectively, which are connected electrically to a high-voltage system battery 6 by an electric power transfer line 18. When the motor/generators MG1 and MG2 are supplied with electric power from the high-voltage system battery 6, the motor/generators function as motors to generate assisting drive power. When the motor/generators MG1 and MG2 are rotated by the drive power from the engine 4, the motor/generator function as power generators to generate electric power.

The high-voltage system battery 6, which corresponds to an electric charge storage device, includes secondary cells connected in series to output high voltage. The secondary cells may be nickel-hydrogen secondary cells. The high-voltage system battery 6 is connected to the inverters 8 and 10 by the electric power transfer line 18, and also connected by an in-system power supply line 19 to various electric loads 16 mounted in the vehicle 1.

The electric loads 16 are a high-voltage system load 16a, which the high-voltage system battery 6 supplies directly with electric power, and low-voltage system loads 16b, which are connected through a DC/DC converter 17 to the in-system power supply line 19.

The low-voltage system loads 16b, which may be lights or the like, are also connected electrically to a low-voltage system battery 21, which may be a lead storage battery. The low-voltage system battery 21 and loads 16b may be considered as one high-voltage system load. The high-voltage system battery 6 and load 16a form a high-voltage power supply system. The low-voltage system battery 21 and loads 16b form a low-voltage power supply system. The high-voltage and low-voltage power supply systems form a power supply system.

An electric power detector 28 detects the current and voltage at the in-system power supply line 19 so as to detect the electric power consumed in the electric power supply system. A battery monitor ECU 22 supplies a hybrid control ECU 24 sequentially with signals representing the residual energy of the high-voltage system battery 6.

A navigation unit 29 includes a memory (not shown), where a map database is stored, and a controller (not shown) to provide a normal route guidance function. Specifically, the navigation unit 29 sets a proposed travel route from a travel starting point to a destination and provides route guidance based on the set route and the present position of the vehicle. The navigation unit 29 has a radio communication device therein. The navigation unit 29 also has the function of acquiring traffic information, which may be traffic jam information, and other necessary information by communicating with outside devices by means of the radio communication device. The controller of the navigation unit 29 has the function of transmitting present limit electric power generation cost Dg_lim_pres and present limit electric assist cost Da_lim_pres sequentially to the hybrid control ECU 24 while the vehicle is traveling along the set route. The present limit costs Dg_lim_pres and Da_lim_pres are the bases for the selection of either one of the electric power generation or drive power assistance. The transmitting function will be described later in detail.

The hybrid control ECU 24 is supplied with a signal representing the vehicle speed V, a signal representing the accelerator position AC, a brake signal Sb representing the ON-state or OFF-state of the brake, a shift lever position signal Ps representing the shift lever position, etc. The hybrid control ECU 24 transmits signals to and receives signals from an MG control ECU 20, the battery monitor ECU 22, an engine control ECU 26, and the navigation unit 29. The hybrid control ECU 24 determines, based on the various signals supplied thereto, a target torque Teref of the engine 4 and target torques TMG1 and TMG2 of the motor/generators MG1 and MG2 respectively. The hybrid control ECU 24 outputs the determined target torques T to the engine control ECU 26 and MG control ECU 20. The MG control ECU 20 so controls the inverters 8 and 10 that the motor/generators MG1 and MG2 output the target torques TMG1 and TMG2 respectively, which are supplied from the hybrid control ECU 24. The engine control ECU 26 so controls the engine 4 that the engine 4 outputs the target torque Teref, which is determined by the hybrid control ECU 24.

Figure 2:
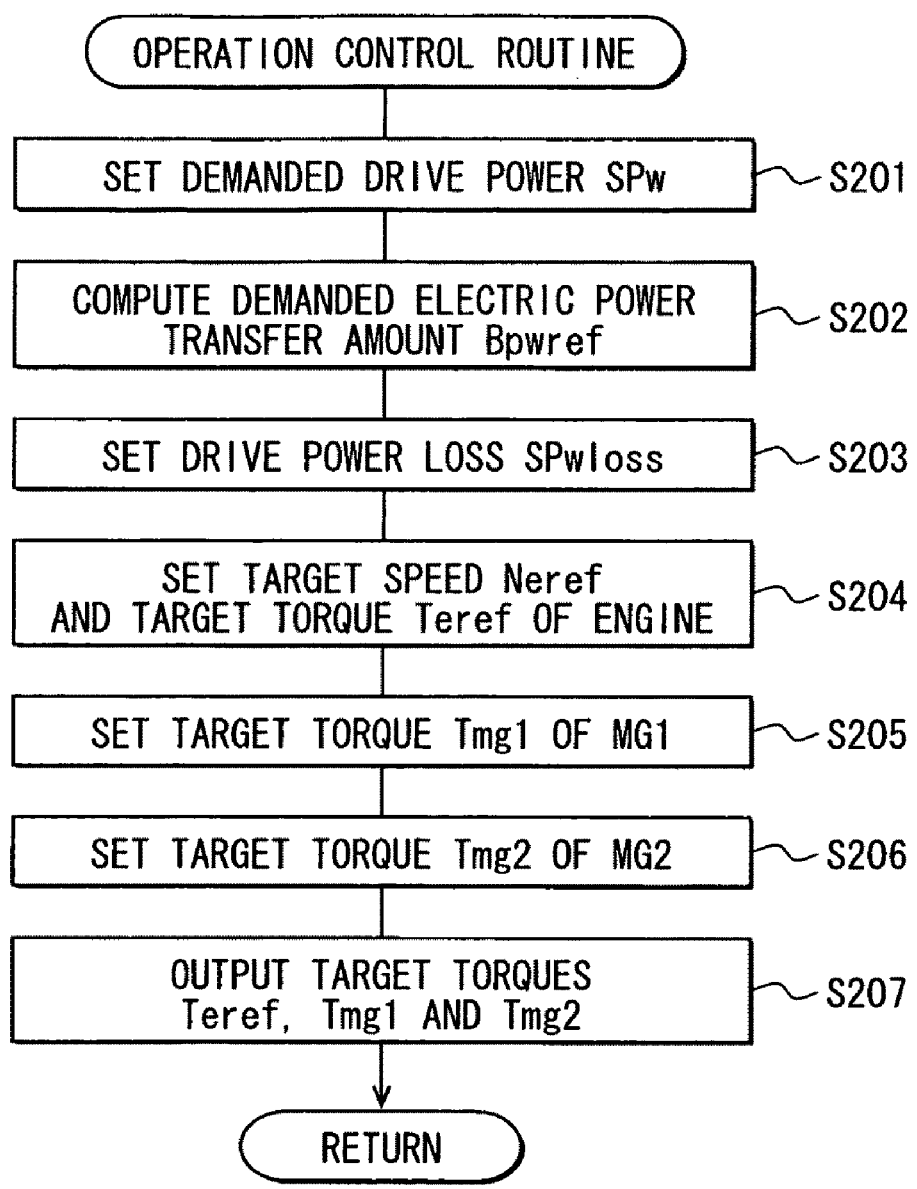
FIG. 2 is a flowchart showing an operation control routine that the hybrid control ECU in FIG. 1 executes.

The hybrid control ECU 24 executes the operation control routine shown in FIG. 2. The operation control routine is executed in cycles while the vehicle is traveling. With reference to FIG. 2, at first step S201, which corresponds to an actual demanded drive power setting section, the hybrid control ECU 24 sets the demanded drive power SPw demanded by the axle 15. The demanded drive power SPw corresponds to actual demanded drive power. The hybrid control ECU 24 sets the demanded drive power SPw from the accelerator opening AC and vehicle speed V, which are supplied to this ECU, with reference to a prestored three-dimensional map.

At next step S202, the hybrid control ECU 24 receives the present limit electric power generation cost Dg_lim_pres and the present limit electric assist cost Da_lim_pres from the navigation unit 29 and computes a demanded electric power transfer amount Bpwref based on the present limit costs Dg_lim_pres and Da_lim_pres, a present electric power generation cost Dg_pres, and a present electric assist cost Da_pres. The demanded electric power transfer amount Bpwref is the electric power transfer amount transferred between the electric power supply system and the motor/generators MG, i.e., the electric power flowing through the electric power transfer line 18. The demanded electric power transfer amount Bpwref is a positive value when this power is demanded by the electric power supply system (when this system is supplied with electric power from the motor/generators MG). The computation of the demanded electric power transfer amount Bpwref will be described later in detail.

At next step S203, the hybrid control ECU 24 sets the drive power loss SPwloss through the drive power transmission paths of the vehicle from the vehicle speed V and the demanded drive power SPw, which was set at step S201, with reference to a prestored three-dimensional map.

At next step S204, the hybrid control ECU 24 sets a target speed Neref and the target torque Teref of the engine. In order to set the target engine speed Neref and target torque Teref, the hybrid control ECU 24 first sets, according to a known equation, the working range within which the engine 4 and motor/generators MG1 and MG2 so work that the drive power of the axle 15 is the demanded drive power SPw set at step S201, and that the electric power transfer amount Wmg to or from the electric power supply system is the demanded electric power transfer amount Bpwref set at step S202. The drive power loss SPwloss set at step S203 and the mechanoelectric conversion loss at the motor/generators MG1 and MG2 are taken into account for the equation. Then, the hybrid control ECU 24 sets, as the target engine speed Neref and target torque Teref, the engine speed Ne and torque Te respectively at the operation point for the minimum fuel consumption rate of the engine 4 within the set working range.

At next step S205, the hybrid control ECU 24 sets the target torque Tmg1 of the motor/generator MG1 for the target engine speed Neref set at step S204. At next step S206, on the assumption that the torque of the engine is the target torque Teref set at step S204, and that the torque of the motor/generator MG1 is the target torque Tmg1 set at step S205, the hybrid control ECU 24 so sets the target torque Tmg2 of the motor/generator MG2 that the drive power of the axle 15 is the demanded drive power SPw set at step S201.

At next step S207, the hybrid control ECU 24 outputs the target torques Teref, Tmg1 and Tmg2, which are set at steps S204 to S206 respectively, to the appropriate ECUs 26 and 20.

The computation of the demanded electric power transfer amount Bpwref at step S202 will be described below. The hybrid control ECU 24 computes the demanded electric power transfer amount Bpwref from the present electric power generation cost Dg_pres [g/kWh], the present electric assist cost Da_pres [g/kWh], the present limit electric power generation cost Dg_lim_pres, and the present limit electric assist cost Da_lim_pres. In this embodiment, the hybrid control ECU 24 computes the present electric power generation cost Dg_pres and electric assist cost Da_pres, and the navigation unit 29 computes the present limit costs Dg_lim_pres and Da_lim_pres and transmits them to the hybrid control ECU 24. First, the computation of the present limit costs Dg_lim_pres and Da_lim_pres by the navigation unit 29 and the transmission of them from this section will be described below.

Figure 3:
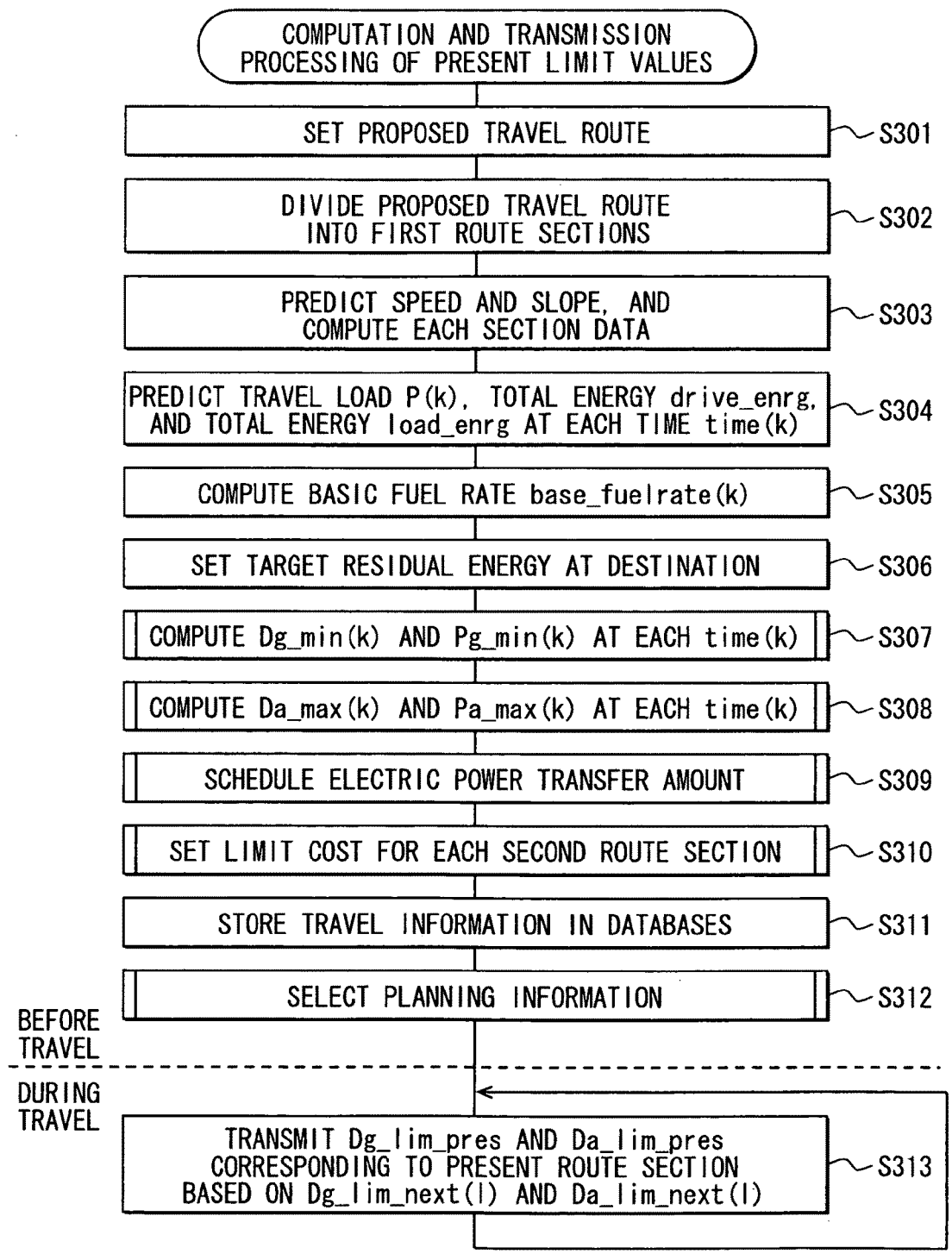
FIG. 3 is a flowchart showing computation and transmission of present limit values that a controller in the navigation unit executes.

The controller in the navigation unit 29 executes the computation and transmission of present limit values as shown in FIG. 3. With reference to FIG. 3, at first step S301, the controller sets the proposed travel route from the starting point to the destination. The starting point may be set by the user. Otherwise, the present point is set as the starting point.

Normally, the destination is set by the user. Even when the destination is not set by the user, it may be set by being estimated from the present point, the date and time, etc.

At next step S302, which corresponds to a route dividing section, the controller divides the proposed travel route, which is set at step S301, into fine first route sections. In this embodiment, each of the first route sections is a section along which the vehicle travels during a sample time. For example, the sample time may be 1 second.

At next step S303, the controller predicts the vehicle speed and slope at which the vehicle travels along the proposed travel route during each sample time. With regard to the vehicle speed, when the vehicle traveled in the past, the vehicle speed histories were stored as a database in the memory of the navigation unit 29. From this database, the controller retrieves the vehicle speed history stored when the vehicle traveled last time along the proposed travel route. With regard to the slope, the slope information of the map database in the navigation unit 29 or the slope information that the controller has acquired by communicating with an outside server may be used.

In this step S303, the controller also computes and stores the time time(k) (k is a natural number representing the number of time steps) for each of the first route sections. In this step, the controller divides the proposed travel route into second route sections at check points (CP) such as intersections. It is essential that the second route section is longer than the first route section, and that the proposed travel route can be divided into the second route sections based on a road map. Then, the controller computes the entry time at which the vehicle enters each of the second route sections. The controller stores the computed entry time in division data section_div (l) (l is a section number). The controller computes the entry time from the map information in the navigation unit 29 and the vehicle speed histories.

Figures 4A, 4B:
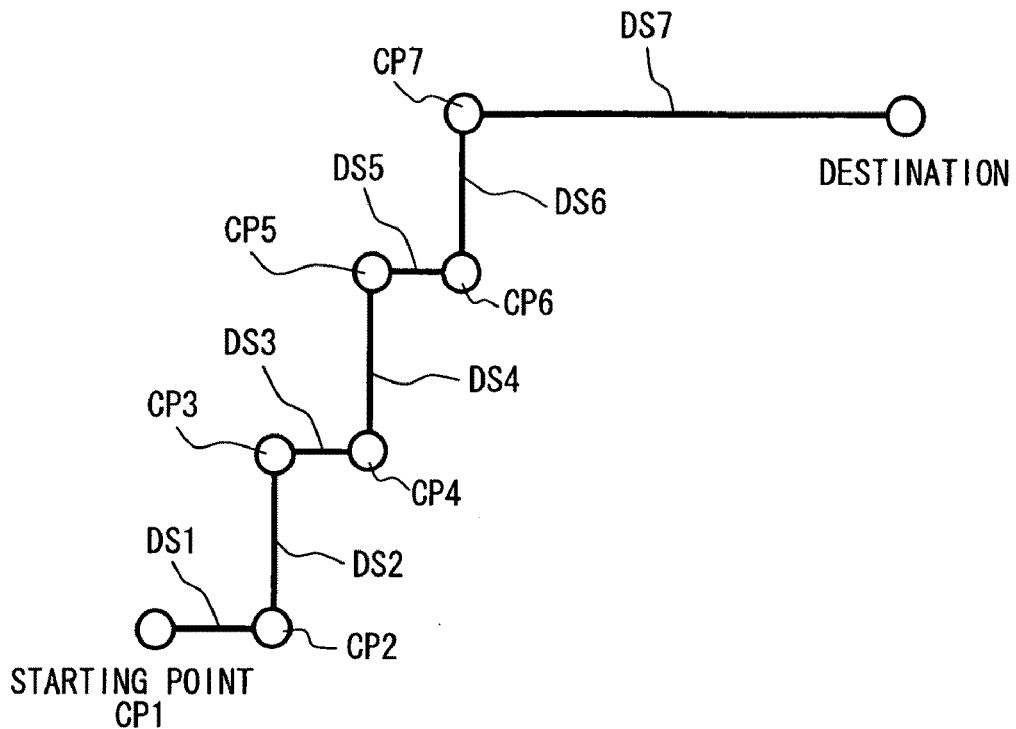
FIG. 4A is a schematic diagram showing examples of the second route sections determined at step S303 in FIG. 3.
FIG. 4B is a table showing a division data format.

FIGS. 4A and 4B show the second route sections determined in this step S303 and a format of the division data section_div(l). In this example, the second route section is referred to simply a "the route section" (DS). In the following description as well, the route section means the second route section.

At next step S304, the controller predicts, at each time time(k), the traveling load P(k) [w], the total traveling energy drive_enrg required by the vehicle for traveling along the proposed travel route, and the total electric load energy consumption load_enrg.

In order to predict the traveling load P(k), the controller first computes, according to EQ. (equation) 1, which will be explained below, the vehicle drive power R(k) that the vehicle needs to generate at each time time(k). Then, the controller converts the drive power R(k) into a traveling load P(k) according to EQ. 2. The traveling load P(k) corresponds to a predicted drive power, because the load may be considered as the electric power necessary for the axle 15. Steps S301, S303 and S304 correspond to a proposed travel route information setting section.

$$R(k) = W \times acc(k) + \mu r \times W + \mu 1 \times A \times V(k) \times V(k) + W \times g \times \sin\theta(k) \quad [\text{EQ. 1}]$$

W: total vehicle weight
acc: vehicle acceleration
μr: coefficient of rolling resistance
μ1: coefficient of air resistance
A: frontal projected area
V: vehicle speed
g: gravitational acceleration
θ: road slope W, μr, μ1, A, and g are prestored constant values. Acc is found by differentiating the vehicle speed. V and θ are predicted at step S303.

$$P(k) = R(k) \times r \times \omega \quad [\text{EQ. 2}]$$

In EQ. 2, r and ω represent the radius and angular velocity respectively of the wheels of the vehicle. r is a prestored constant value. ω is computed from V used in EQ. 1.

The total traveling energy drive_enrg can be computed by means of the time quadrature of the positive values (positive drive power) of the computed traveling load P(k) for the whole proposed travel route. The controller predicts the average electric power consumption load_power required when the vehicle travels along the proposed travel route. Then, the controller computes the total electric load energy consumption load_enrg from the product of the predicted power consumption load_power and the traveling time. The average value of the present electric power consumption may be measured and assumed as the average electric power consumption load_power, which may be predicted from past histories. Alternatively, the operation of the lights and air conditioner of the vehicle may be predicted from information about time, air temperature, etc. Then, the average electric power consumption load_power may be predicted from the results of the operation prediction.

At next step S305, the controller computes the basic fuel consumption rate, fuelrate(k) [g/h] for each time time(k). The basic fuel consumption rate is the amount of fuel consumed when the traveling load P(k) predicted at step S304 is output only by the engine 4 on the assumption that the electric power transfer amount Wmg between the motor/generators MG and the electric power supply system is zero, i.e., no current flows through the electric power transfer line 18.

In order to compute the basic fuel consumption rate fuelrate, the controller first computes candidate basic engine operation points (Ne0[i], Te0[i]) for each time time(k). The candidate basic engine operation points (Ne0[i], Te0[i]) are the candidate engine operation points (engine speed Ne and engine torque Te) at which only the engine 4 outputs the traveling load P(k) predicted at step S304, on the assumption that the electric power transfer amount Wmg to or from the electric power supply system is zero. At step S305, [i] is a natural number between 1 and n1. n1 may be preset at a constant number, or all possible candidates may be computed as n1. The energy conversion efficiencies of the motor/generators MG1 and MG2 and the mechanical losses through the drive power transmission paths as well are taken into account for the computation of the candidate basic engine operation points. The conversion efficiencies and the mechanical losses are experimentally preset values. The candidate basic engine operation points (Ne0[i], Te0[i]) might, instead of being computed, be determined from the traveling load P according to a prestored map.

Subsequently, the controller computes the fuel consumption per section time at each of the candidate basic engine operation points (Ne0[i], Te0[i]) by using a prestored map defining the relationship between engine operation points and fuel consumption. Then, the controller sets the minimum value of the computed fuel consumption as the basic fuel consumption rate, fuelrate(k).

At next step S306, the controller sets the target residual energy at the destination. In this embodiment, the controller sets the target residual energy as the present residual energy. At step S307, which corresponds to an electric power generation cost computing section, the controller computes the minimum electric power generation cost Dg_min(k) at each time time(k) and the electric power Pg_min(k) at the time the electric power generation cost is lowest. At step S308, which corresponds to an electric assist cost computing section, the controller computes the maximum electric assist cost Da_max(k) at each time time(k) and the electric power Pa_max(k) at the time the electric assist cost is highest. At step S309, the controller schedules the demanded electric power transfer amount Bpwref for each time time(k). FIGS. 10A and 10B shows, along the same time axis, the vehicle speed predicted at step S303 (FIG. 10A) and the result of the scheduling at step S309 (FIG. 10B). Steps S307 to S309 will be described later with reference to FIGS. 5 to 9.

At step S310, the controller sets the limit electric power generation cost (threshold) Dg_lim and the limit electric assist cost Da_lim for each of the second route sections. This processing will be described later with reference to FIG. 13.

Figure 11:
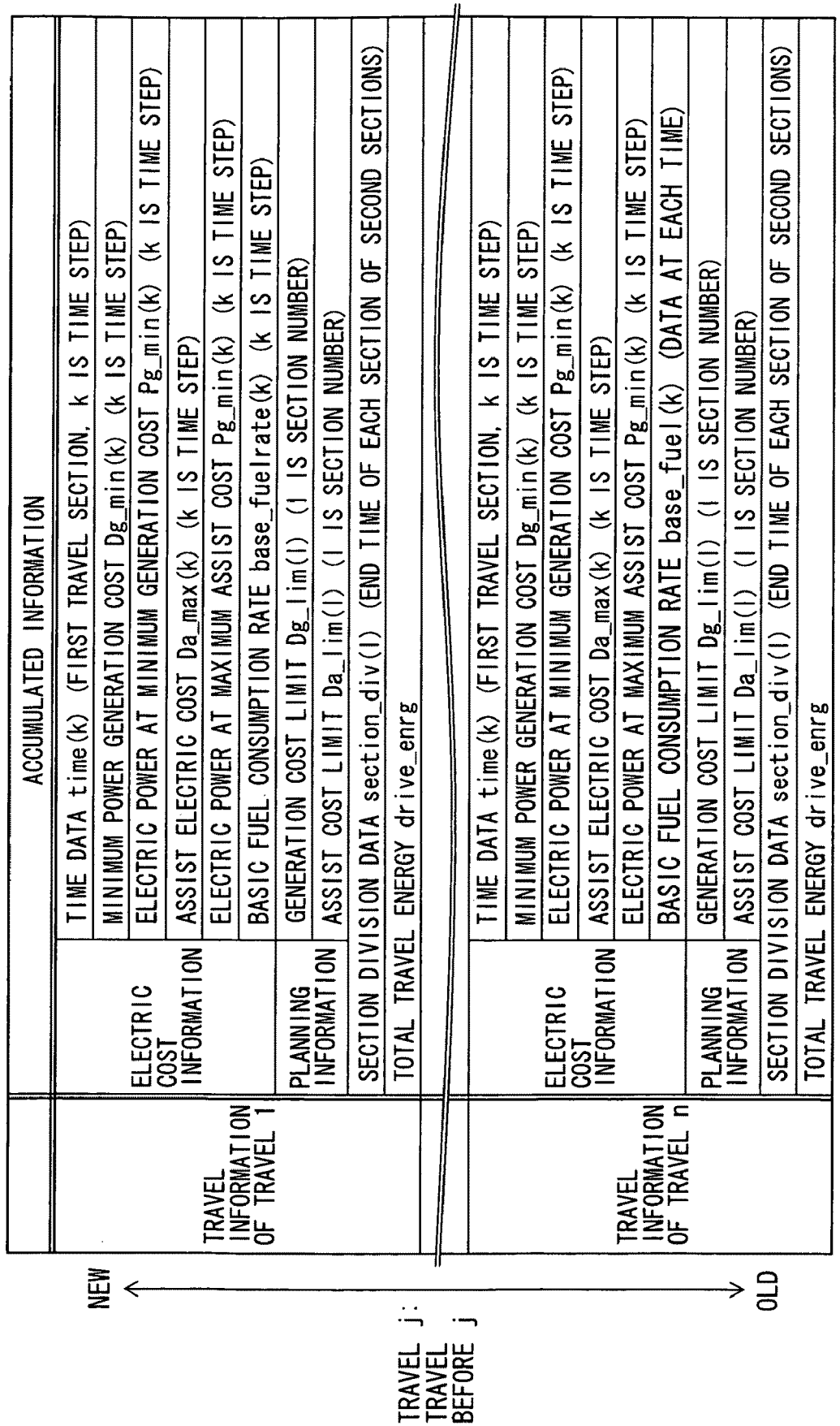
FIG. 11 is a table showing travel information databases in the navigation unit.
Figure 12:
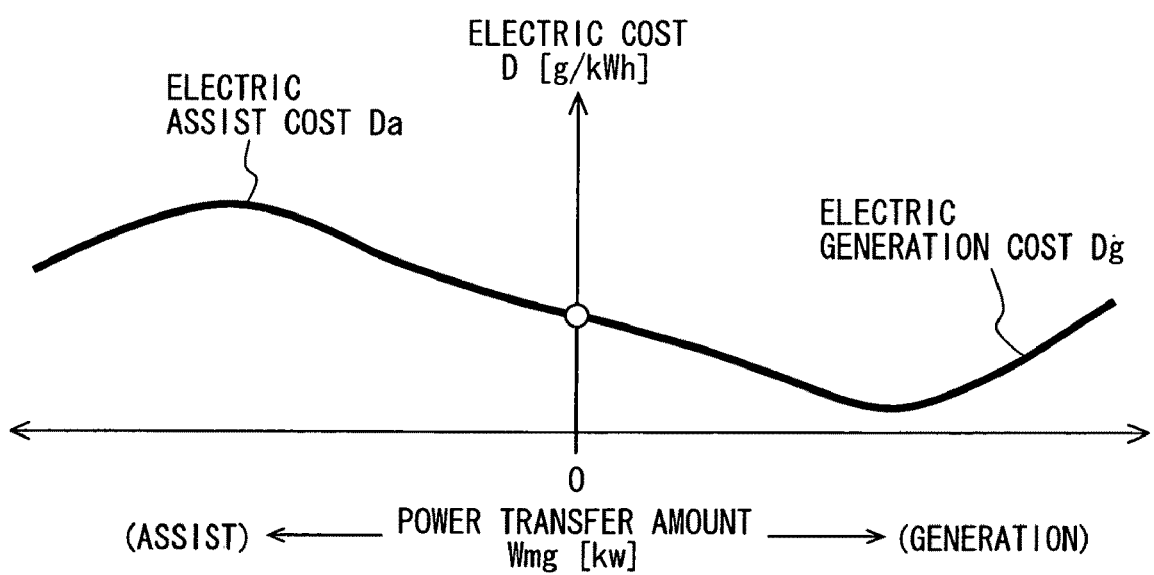
FIG. 12 is a graph showing the relationship between costs and the electric power transfer amount between motor/generators and power supply system of the vehicle.

At step S311, the controller stores, in the travel information databases in the navigation unit 29, the various pieces of information computed at steps S301 to S310. FIG. 11 shows the travel information databases.

The information acquired when the vehicle traveled a number of times (n-times) along each route is accumulated in one of the travel information databases, from which the information acquired when the vehicle had already traveled there is deleted in order. As shown in FIG. 11, the accumulated information includes cost information, planning information, division data section_div(l), and total traveling energy drive_enrg. The cost information is computed at steps S301 to S308 in FIG. 3. The planning information is computed at step S310. The division data section_div(l) is computed at step S303. The total traveling energy drive_enrg is computed at step S304. Each of the travel information databases is provided for one of the travel routes. The travel information databases can be switched for the next predicted travel route.

At step S312, the controller selects, from the travel information accumulated in the travel information databases, one of the pieces of travel information acquired when the vehicle traveled along each route. In this step, the controller then sets, as the planning information for the next traveling, the planning information included in the selected piece of travel information. As shown in FIG. 11, the planning information includes a limit electric power generation cost Dg_lim(l) and a limit electric assist cost Da_lim(l). As a result, in this step S312, the controller selects the limit electric power generation cost Dg_lim(l) and limit electric assist cost Da_lim(l) for the next traveling. The controller sets, as a limit electric power generation cost Dg_lim_next(l) and a limit electric assist cost Da_lim_next(l), the limit costs Dg_lim(l) and Da_lim(l) respectively selected in this step S312. This step will also be described later in detail.

The controller executes steps S301 to S312 before the vehicle travels. While the vehicle is traveling, the controller repeats next step S313. At step S313, the controller determines, from the pieces of present location information determined sequentially by the navigation unit 29, which of the route sections the vehicle is traveling along. Subsequently in this step, from the planning information selected at step S312, i.e., the limit electric power generation cost Dg_lim_next(l) and limit electric assist cost Da_lim_next(l), the controller sets, as the present limit electric power generation cost Dg_lim_pres and the present limit electric assist cost Da_lim_pres, the limit generating and electric assist costs respectively for the route section along which the vehicle is traveling. Finally in this step, the controller transmits the thus set values to the hybrid control ECU 24. The present limit electric power generation cost Dg_lim_pres and present limit electric assist cost Da_lim_pres are used for the computation of the demanded electric power transfer amount Bpwref at step S202.

The computation of the demanded electric power transfer amount Bpwref will be described later. Steps S307 to S309 will be described below with reference to FIGS. 5 to 9 and 12. First, step S307 will be described.

At step S307, as described above, the controller computes the minimum electric power generation cost Dg_min(k) at each time time(k) and the electric power Pg_min(k) at the time the electric power generation cost is lowest. An electric power generation cost Dg is the ratio of an increase in fuel consumption to the electric power transfer amount Wmg generated by the motor/generator MG1 or MG2. The electric power generation cost Dg varies with the electric power transfer amount Wmg as a parameter because the engine operation points change with the electric power transfer amount Wmg generated by the motor/generator MG1 or MG2, and because the power generation efficiencies of the motor/generators MG vary, and for other reasons. The right quadrant in FIG. 12 exemplifies the relationship between the electric power generation cost Dg and the electric power transfer amount Wmg supplied from the motor/generators MG to the electric power supply system. However, during regenerative braking, the electric power generation cost Dg is zero because the generation of the electric power transfer amount Wmg keeps the fuel consumption from increasing. The left quadrant in FIG. 12 exemplifies the relationship between an electric assist cost Da, which will be explained later, the electric power transfer amount Wmg supplied from the electric power supply system to the motor/generators MG.

Figure 5:
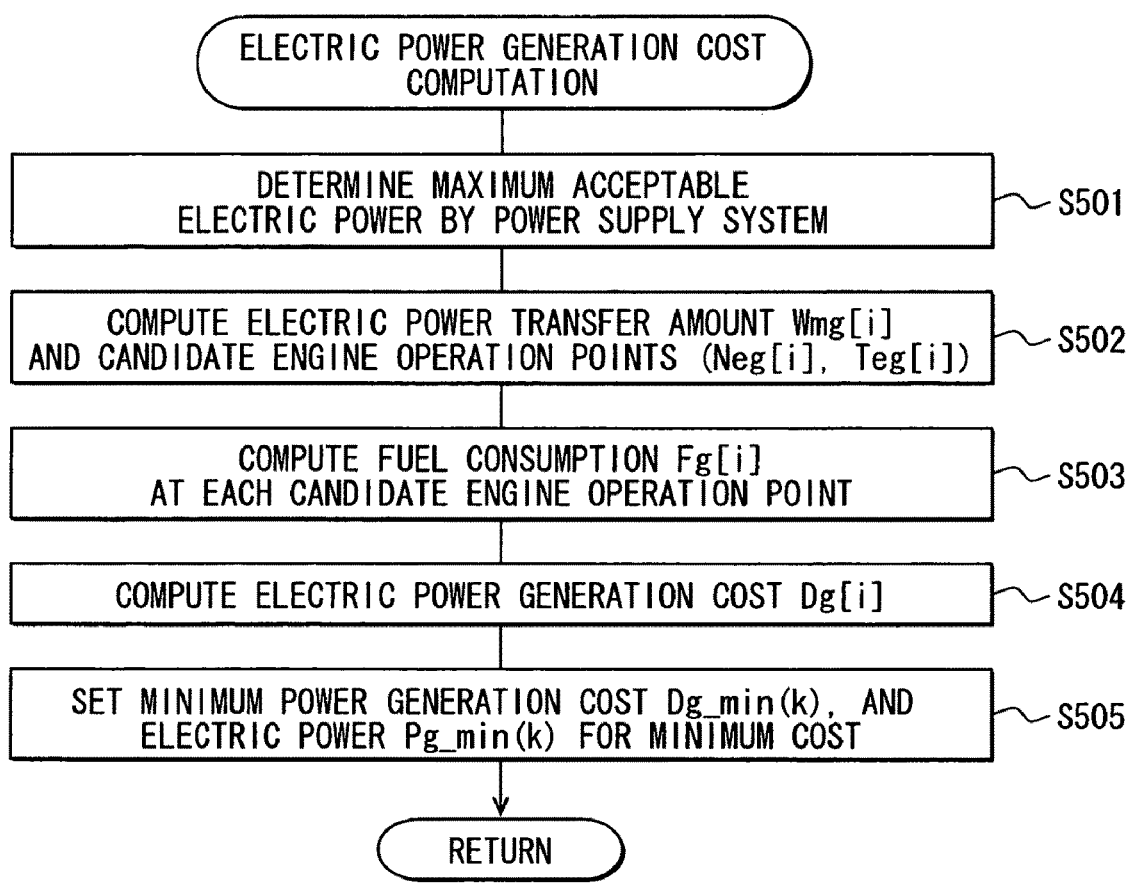
FIG. 5 is a flowchart showing details of step S307 in FIG. 3.

FIG. 5 shows step S307 in detail. The processing shown in FIG. 5 determines the minimum point on the curve in the right quadrant in FIG. 12. The controller executes this processing for each time time(k).

First, at step S501, the controller determines the maximum electric power that can be accepted by the electric power supply system (hereinafter referred to as "the maximum acceptable electric power"). The maximum acceptable electric power is the sum of the electric power consumed in the electric power supply system at each time time(k) and the electric power with which the high-voltage system battery 6 can be charged. The electric power consumption predicted at step S304 is used as the electric power consumption in the electric power supply system. The electric power with which the battery 6 can be charged is a value based on the relationship of the terminal voltage of the battery to the electric power with which the battery is charged, and on the upper limit voltage of the battery. In this embodiment, the electric power with which the battery 6 can be charged is a prestored constant value.

At next step S502, the controller computes the amounts Wmg[i] of electric power transfer generated by driving the motor/generators MG with the drive power from the engine 4 and supplied to the electric power supply system, the amounts Wmg[i] being equal to or smaller than the maximum acceptable electric power determined at step S501. At step S502, [i] is a natural number between 1 and n2, which may be a preset constant number or a number determined by setting the amounts Wmg of electric power transfer at specified intervals from 0 to the maximum acceptable electric power.

In this step S502, the controller computes, in the same manner as at step S305 in FIG. 3, the candidate operation points (Neg[i], Teg[i]) at which the engine 4 so drives the motor/generator MG1 or MG2 that the generator generates each amount Wmg[i] of electric power transfer, and which satisfy the traveling load P(k) predicted at step S304. Hereinafter, these candidate operation points will be referred to as "the candidate power generation engine operation points". When there are a plurality of candidate power generation engine operation points for one of the amounts Wmg[i] of electric power transfer, the controller finds the fuel consumption at each of the points in the same way as at step S305 and sets the candidate power generation operation point for the minimum fuel consumption as the candidate power generation engine operation point (Neg[i], Teg[i]) associated with this amount Wmg[i].

At next step S503, the controller computes the fuel consumption (fuel consumption during electric power generation) Fg[i] per section time at each of the candidate power generation engine operation points (Neg[i], Teg[i]) computed at step S502. The controller executes this processing as well for each time time(k). The prestored map showing the relationship between engine operation points and fuel consumption is used for the computation of the fuel consumption Fg[i] during electric power generation. The controller executes this step S503 as well for each time time(k).

At next step S504, the controller computes, for the fuel consumption Fg[i] (i ranges between 1 and n2) during electric power generation computed at step S503, the electric power generation cost Dg[i] (i ranges between 1 and n2) from the amount Wmg[i] of electric power transfer associated with this consumption, and from the basic fuel consumption rate base_fuelrate(k) computed at step S305, according to EQ. 3, which will be described below. The controller executes this processing as well for each time time(k).

$$Dg[i]=(Fg[i]-base\_fuelrate(k)/Wmg[i]) \quad \text{[EQ. 3]}$$

As evident from the right side of EQ. 3, a smaller absolute value of electric power generation cost Dg[i] makes it possible to generate the same electric power with a smaller fuel increase, so that the fuel consumption can be reduced efficiently.

At next step S505, the controller sets the minimum value of the electric power generation costs Dg[i] computed at step S504, as the minimum electric power generation cost Dg_min(k) for each time time(k), and also sets the electric power generated at that time, as the electric power Pg_min(k) at the time the electric power generation cost is lowest.

Figure 6:
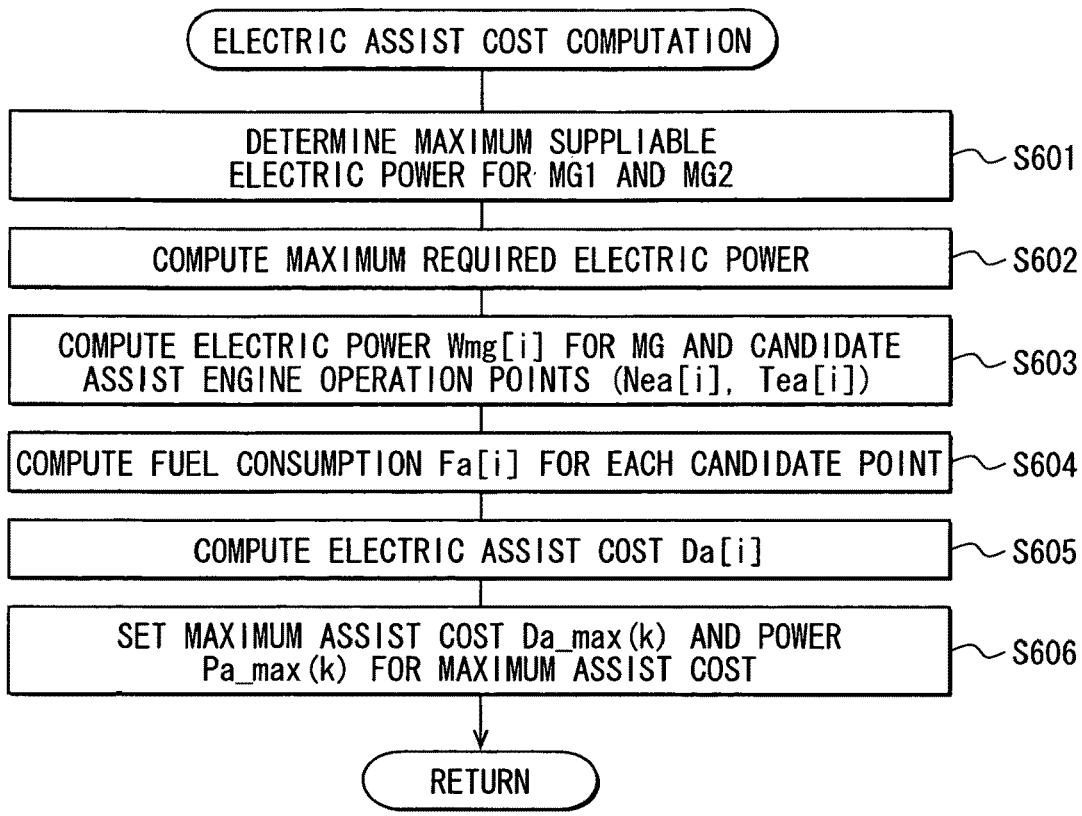
FIG. 6 is a flowchart showing details of step S308 in FIG. 3.

Step S308 will be described below with reference to FIG. 6. At step S308, as described above, the controller computes the maximum electric assist cost Da_max(k) at each time time(k) and the electric power Pa_max(k) at the time the electric assist cost is highest. The electric assist cost Da is the ratio of a decrease in fuel consumption to the electric power transfer amount Wmg supplied from the electric power supply system. As shown in the left quadrant in FIG. 12, the electric assist cost Da varies with the electric power transfer amount Wmg as a parameter because the drive efficiencies of the motor/generators MG vary with the electric energy supplied to them, and for other reasons. The processing shown in FIG. 6 determines the maximum point on the curve in the left quadrant in FIG. 12. The controller executes this processing for each time time(k).

First, at step S601, the controller determines the maximum electric power (hereinafter referred to as "the maximum suppliable electric power") that can be supplied from the electric power supply system to the motor/generators MG. The maximum suppliable electric power is the value remaining after the electric power consumed in the electric power supply system is subtracted from the electric power dischargeable from the high-voltage system battery 6. The dischargeable power is a value based on the relationship of the terminal voltage of the battery 6 to the electric power discharged from the battery, and on the lower limit voltage of the battery. In this embodiment, the dischargeable power is a prestored constant value. As is the case with step S304, the average electric power consumption is used as the electric power consumption in the electric power supply system. Alternatively, based on the past traveling histories, the electric power consumption in the electric power supply system might be predicted per time time(k).

At next step S602, the controller computes, as the maximum required electric power, the electric power required to be supplied from the electric power supply system to the motor/generator MG2 if only this generator outputs the traveling load P(k) predicted at step S304 in FIG. 3.

At next step S603, the controller determines the amounts Wmg[i] of electric power transfer supplied from the electric power supply system to the motor/generators MG, the amounts Wmg[i] being equal to or smaller than the maximum suppliable electric power determined at step S601 and the maximum required electric power computed at step S602. The electric power supplied from the electric power supply system to the motor/generators MG is defined as negative. At step S603, [i] is a natural number between 1 and n3, which may be a preset constant number or a number determined by setting the amounts Wmg of electric power transfer at specified intervals from 0 to the maximum required electric power.

In this step S603, the controller computes, in the same manner as at step S502 in FIG. 5, on the assumption that the motor/generators MG are rotated by the amounts Wmg[i] of electric power transfer supplied to them, and that the drive power generated by the rotation has been transmitted to the axle 15, the candidate engine operation points (Nea[i], Tea[i]) at which the engine 4 generates the remaining traveling load P(k). Hereinafter, these candidate engine operation points will be referred to as "the candidate assist engine operation points". When there are a plurality of candidate assist engine operation points for one of the amounts Wmg[i] of electric power transfer determined at step S603, the controller finds the fuel consumption at each of the points in the same way as at step S502 and sets the candidate assist engine operation point for the minimum fuel consumption as the candidate assisting engine operation point (Nea[i], Tea[i]) associated with this amount Wmg[i].

At next step S604, the controller computes the fuel consumption (fuel consumption during assistance) Fa[i] per section time at each of the candidate assist engine operation points (Nea[i], Tea[i]) computed at step S603. As is the case with step S503, the prestored map defining the relationship between engine operation points and fuel consumption is used for the computation of the fuel consumption Fa[i] during assistance. The controller executes this step S604 as well for each time time(k).

At next step S605, the controller computes, for the fuel consumption amount Fa[i] (i ranges between 1 and n3) during assistance computed at step S604, the electric assist cost Da[i] (i ranges between 1 and n3) from the amount Wmg[i] of assisting electric power transfer associated with this consumption, and from the basic fuel consumption amount base_fuelrate(k) computed at step S305, according to EQ. 4, which will be described below.

$$Da[i]=(Fa[i]-base\_fuelrate(k)/Wmg[i]) \quad \text{[EQ. 4]}$$

As evident from the right side of EQ. 4, a higher electric assist cost Da[i] makes it possible to more reduce the fuel consumption, with the same electric power supplied, so that the fuel consumption can be reduced efficiently. As described above, the electric power supplied from the electric power supply system to the motor/generators MG is defined as negative. Therefore, because both the denominator and numerator in EQ. 4 are negative values, the electric assist cost Da[i] is a positive value.

At next step S606, the controller sets the maximum value of the electric assist costs Da[i] computed at step S605, as the maximum electric assist cost Da_max(k) for each time time (k), and also sets the assisting electric power at that time as the electric power Pa_max(k) at the time the electric assist cost is highest.

Step S309 will be described below in detail with reference to FIG. 7. The processing shown in FIG. 7 determines the scheduled electric power transfer amount scheduled_power (k) at each time time(k) for the minimum amount of fuel consumed when the vehicle travels along the proposed travel route on the condition that the residual energy of the high-voltage system battery 6 should, at the destination, be the target residual energy set at step S306 in FIG. 3, and should range between a preset upper limit and a preset lower limit while the vehicle is traveling to the destination.

Figure 7:
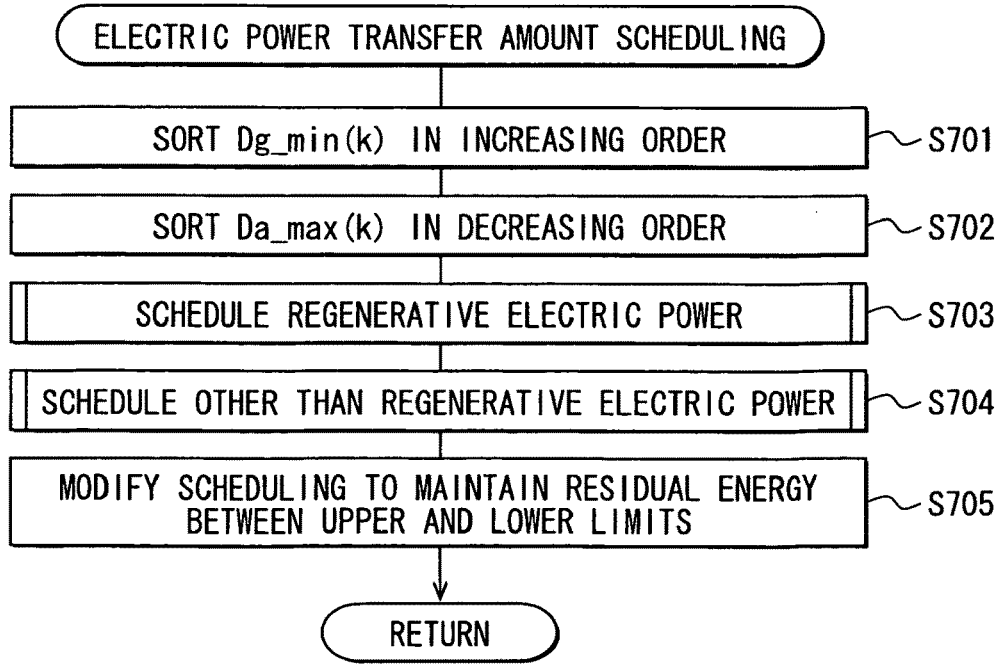
FIG. 7 is a flowchart showing details of step S309 in FIG. 3.

With reference to FIG. 7, at first step S701, the controller sorts, in increasing order, the minimum electric power generation costs Dg_min(k) each determined for the associated time time(k) at step S505 in FIG. 5. At next step S702, the controller sorts, in decreasing order, the maximum electric assist costs Da_max(k) each determined for the associated time time(k) at step S606 in FIG. 6.

At next steps S703 and S704, the controller schedules electric power transfer by using the minimum electric power generation costs Dg_min(k) and maximum electric assist costs Da_max(k) sorted at steps S701 and S702 respectively. First, at step S703, the controller schedules regenerative electric power.

Figure 8:
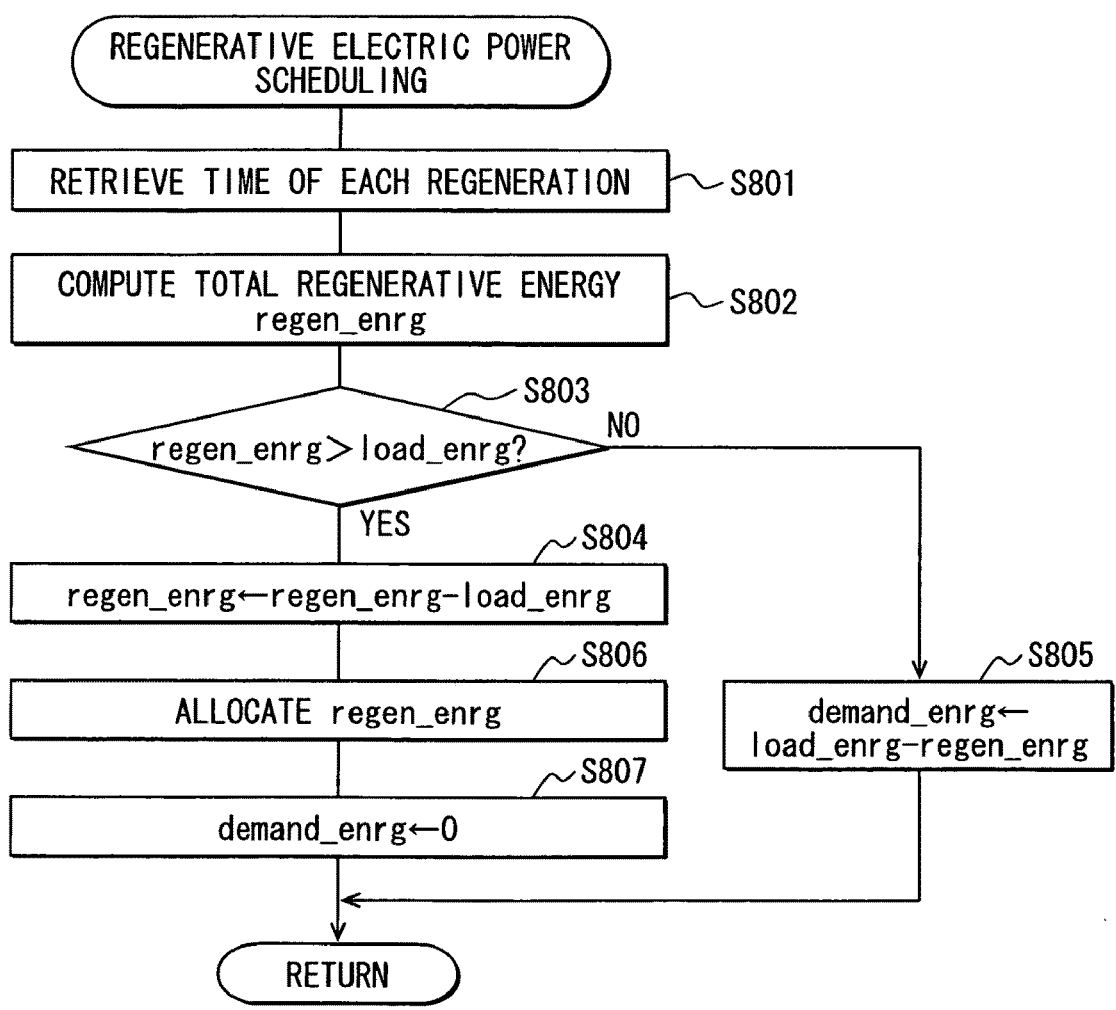
FIG. 8 is a flowchart showing details of step S703 in FIG. 7.

FIG. 8 shows step S703 in detail. First, at step S801, the controller retrieves times of regeneration from all times time (k). The times of regeneration are the times when the minimum electric power generation costs Dg_min(k) are zero.

At next step S802, the controller determines to generate, at the times of regeneration retrieved at step S801, the electric power Pg_min(k) for the minimum electric power generation costs at the retrieved times. At step S802, the controller then computes the total regenerative energy regen_enrg based on the total value of the electric power Pg_min(k) for these minimum electric power generation costs.

At next step S803, the controller determines whether the total regenerative energy regen_enrg computed at step S802 is more than the total electric load energy consumption load_enrg predicted at step S304. When the result of the determination is positive (yes), the regenerative energy is sufficient as all the energy consumed by the electric loads. In this case, the processing proceeds to step S804, where the controller updates the total regenerative energy regen_enrg to the value remaining after the total electric load energy consumption load_enrg predicted at step S304 is subtracted from the value regen_enrg computed at step S802. The updated value regen_enrg is the energy remaining after the electric loads consume part of the regenerated energy.

At step S806, the controller allocates, based on the result of the sorting at step S702, the updated total regenerative energy regen_enrg in order from the time time(k) for which the maximum electric assist cost Da_max(k) is highest. The energy allocated for each time time(k) is the product of the electric power Pa_max(k) at the time the electric assist cost is highest at the time time(k) and the sample time. The allocation at step S806 continues until the total regenerative energy regen_enrg becomes so little that the energy cannot be allocated for the time time(k) for which the maximum electric assist cost Da_max(k) is highest, the parameter being associated with one of the route sections for which the energy is not allocated. The scheduled electric power transfer amount scheduled_power(k) is defined for the time time(k) for which the energy is allocated in this step S806.

Demanded energy demand_enrg is the energy demanded from the high-voltage system battery 6. After the energy allocation at step S806, the processing proceeds to step S807, where the controller resets the demanded energy demand_enrg to zero. Then, this subroutine ends, and the processing proceeds to step S604 in FIG. 6.

When the result of the determination at step S803 is negative (no), the regenerative energy is not sufficient as all the energy consumed by the electric loads. In this case, the processing proceeds to step S805, where the controller sets the demanded energy demand_enrg as the value remaining after the total regenerative energy regen_enrg computed at step S802 is subtracted from the total electric load energy consumption load_enrg predicted at step S304. Then, this subroutine ends, and the processing proceeds to step S704 in FIG. 7.

Figure 9:
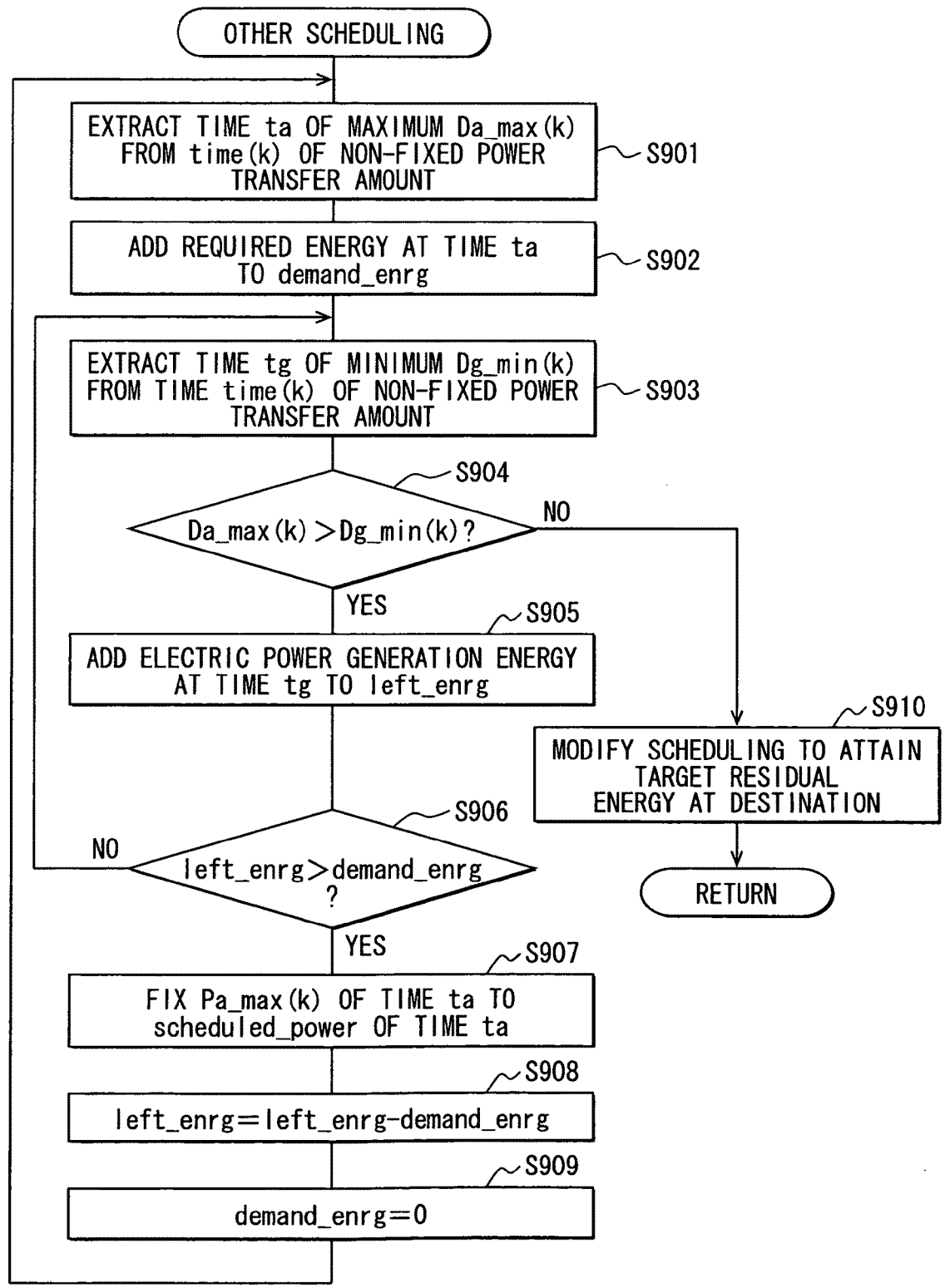
FIG. 9 is a flowchart showing details of step S704 in FIG. 7.
Figure 10A:
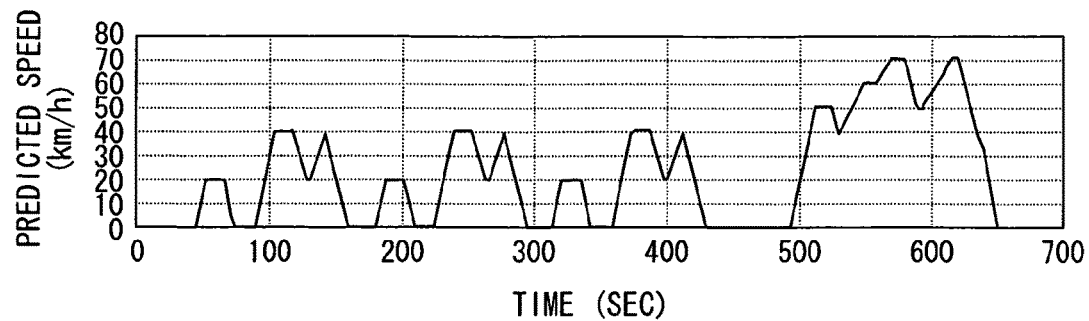
FIG. 10A is a time chart showing a vehicle speed predicted at step S303 in FIG. 3.
Figure 10B:
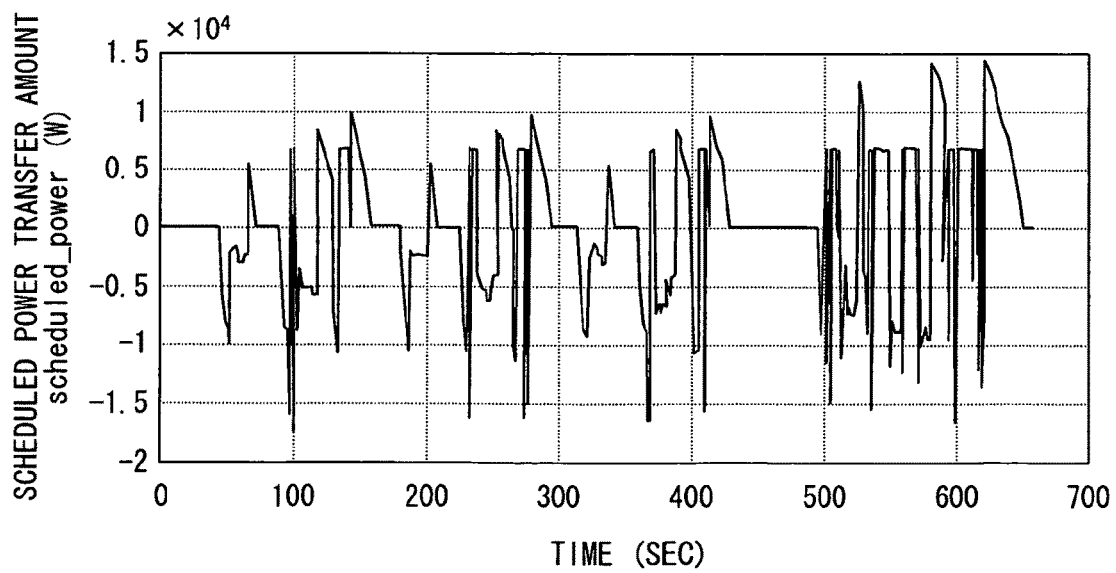
FIG. 10B is a time chart showing a result of scheduling at step S309 in FIG. 3.

FIG. 9 shows the scheduling at step S704 in FIG. 7. Step S704 will be described below with reference to FIG. 9. With reference to FIG. 9, at first step S901, the controller extracts, from the times time(k) for which no amounts scheduled_power(k) of scheduled electric power transfer are defined, the time ta at which the maximum electric assist cost Da_max(k) is highest. At next step S902, the controller computes, from the product of the electric power Pa_max(k) at the time the electric assist cost is highest and the sample time, the energy demanded by the motor/generators MG from the electric power supply system at the time ta extracted at step S901. At step S902, the controller then adds the computed value to the demanded energy demand_enrg.

At next step S903, the controller extracts, from the times time(k) for which no amounts scheduled_power(k) of scheduled electric power transfer are defined, the time tg at which the minimum electric power generation cost Dg_min(k) is lowest. At next step S904, the controller determines whether the maximum electric assist cost Da_max(k) at the time ta is higher than the minimum electric power generation cost Dg_min(k) at the time tg.

When the result of the determination at step S904 is positive (yes), the fuel consumption rate is improved by the traveling in a drive power assist mode at the time ta with the electric power generated at the time tg. In this case, the processing proceeds to step S901, where the controller adds, to left_enrg, the energy (Pg_min(k)×sample time) at the time the electric power generation cost is lowest at the time tg extracted at step S903.

At next step S906, the controller determines whether left_enrg is more than the demanded energy demand_enrg. When the result of the determination is negative (no), the electric power that may be generated at the time tg extracted at the preceding step S903 is not sufficient as the electric power for driving the motor/generators MG at the time ta. In this case, the processing returns to step S903, where the controller again extracts, from the times time(k) for which no amounts scheduled_power(k) of scheduled electric power transfer are defined, the time tg at which the minimum electric power generation cost Dg_min(k) is lowest. Then, the controller again executes the determination at step S904 with the minimum electric power generation cost Dg_min(k) at the newly extracted time tg.

When the result of the determination at step S904 is negative (no), the fuel consumption rate is not improved by the traveling in the drive power assist mode at the time ta with the electric power generated at the time tg. In this case, the processing proceeds to step S910, where the controller modifies the scheduling for the target residual energy set at step S306 in FIG. 3 at the destination.

The controller modifies the scheduling by computing, from an integrated value of the amounts scheduled_power(k) of scheduled electric power transfer and the total electric load energy consumption load_enrg predicted at step S304, the difference between the amount of energy remaining before the vehicle travels along the proposed travel route and the amount of energy remaining after the vehicle travels along this route. When the difference is negative, i.e., when the residual energy decreases, the controller increases the traveling time in the electric power generation mode and/or reduces the traveling time in the drive power assist mode. When the difference is positive, i.e., when the residual energy increases, the controller reduces the traveling time in the electric power generation mode and/or increases the traveling time in the drive power assist mode. The controller increases or reduces, based on the minimum electric power generation cost Dg_min(k) or the maximum electric assist cost Da_max(k), the traveling time in either mode in order from the time at which the effect of the improvement in the fuel consumption rate is least. The generated or assisting electric power P at each time is the electric power Pg_min(k) at the time the electric power generation cost is lowest at that time or the electric power Pa_max(k) at the time the electric assist cost is highest at that time.

When the result of the determination at step S906 is positive (yes), the fuel consumption rate is further improved by the traveling in the drive power assist mode at the time ta with the electric power generated at one or more times tg. In this case, the processing proceeds to step S907, where the controller fixes the scheduled electric power transfer amount scheduled_power(k) at the time ta as the electric power Pg_min(k) at the time the electric power generation cost is lowest at the time ta.

At step S908, the controller sets, as new left_enrg, the value remaining after the demanded energy demand_enrg defined at step S907 is subtracted from left_enrg computed at step S905. At next step S909, the controller resets the demanded energy demand_enrg to zero. Subsequently, the processing returns to step S901, where the controller extracts a candidate time ta at which the vehicle travels in the drive power assist mode. Then, the controller repeats step S902 and the succeeding steps.

After the scheduling shown in FIG. 9, the processing proceeds to step S705 in FIG. 7. At step S705, the controller so modifies the scheduling that the residual energy of the high-voltage system battery 6 ranges between the upper and lower limits when electric power generation or assistance is provided according to the scheduling. For this purpose, the controller first computes the residual energy of the battery 6 for each time time(k) by integrating the scheduled energy. When the residual energy is more than the upper limit or less than the lower limit, the controller causes the residual energy at that time to range between the upper and lower limits, by reducing the electric power transferred at the time time(k) between the motor/generators MG and the electric power supply system. In the meantime, the controller also reduces the electric power transfer amount Wmg in the opposite direction for the decrease in the transferred power. In order to reduce the electric power transfer amount Wmg in the opposite direction at the time of electric power generation, the controller reduces this amount at the time the electric power generation cost Dg is highest. In order to reduce the electric power transfer amount Wmg in the opposite direction during the traveling in the drive power assist mode, the controller reduces this amount at the time the electric assist cost Da is lowest.

FIG. 10B shows the thus-determined scheduled electric power transfer amount scheduled_power(k). After the determination of the scheduling of the electric power transfer amount, the processing proceeds to step S310 in FIG. 3. At step S310, the controller sets the limit electric power generation cost Dg_lim and the limit electric assist cost Da_lim for each of the second route sections.

Figure 13:
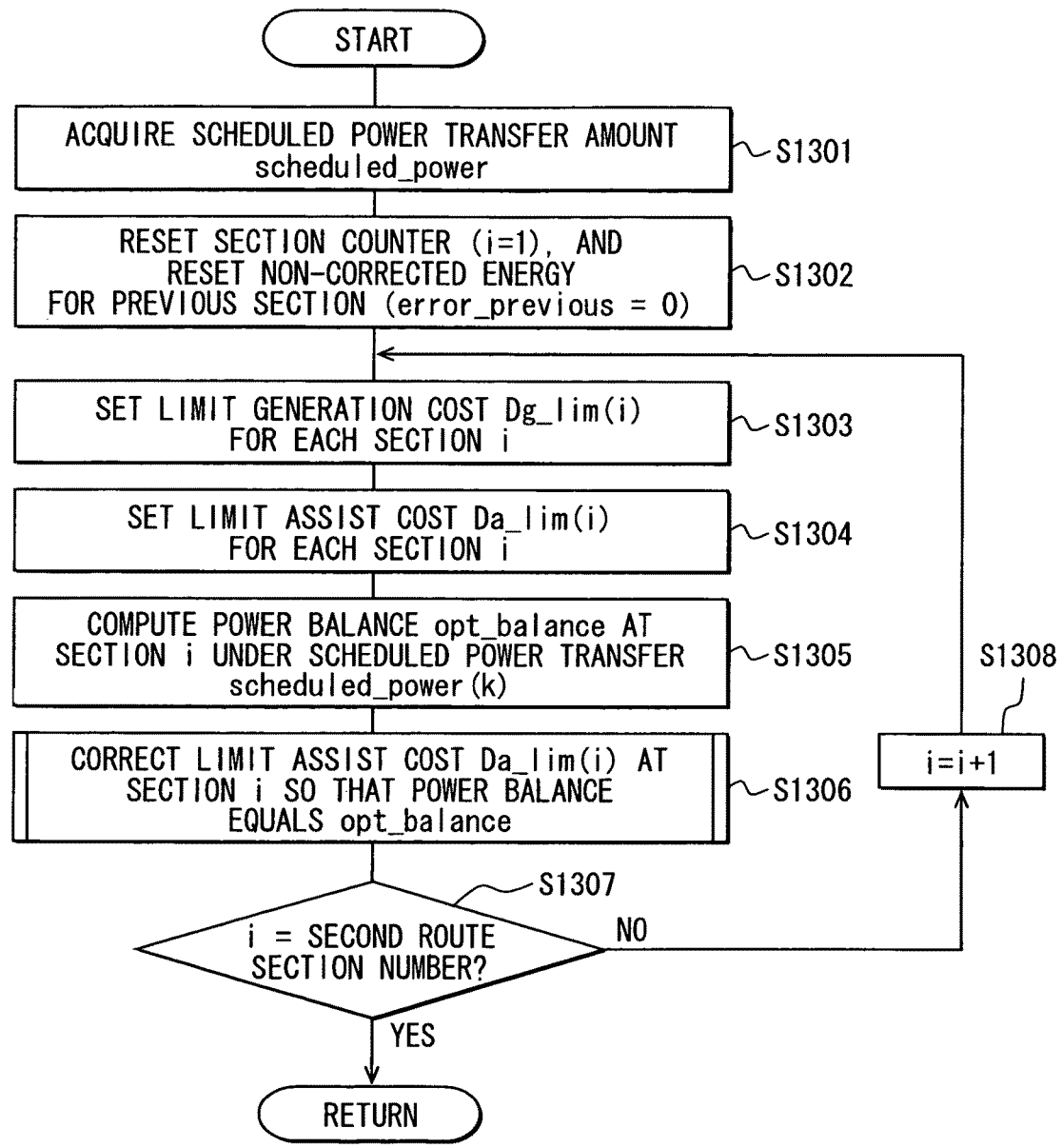
FIG. 13 is a flowchart showing details of step S310 in FIG. 3.

FIG. 13 shows the details of step S310. The processing shown in FIG. 13 determines, for each of the second route sections, the limit electric power generation cost Dg_lim and limit electric assist cost Da_lim at which electric power generation or assistance nearer to the scheduled electric power transfer amount scheduled_power(k) determined at step S309 can be provided when the vehicle travels actually.

In FIG. 13, in order to determine the limit electric power generation cost Dg_lim and limit electric assist cost Da_lim for each of the second route sections, the controller estimates the electric power balance for each of these sections during the traveling along the proposed travel route while varying the limit costs Dg_lim and Da_lim at the section. Then, the controller sets, as the limit values to be stored in the travel information database, the limit costs Dg_lim and Da_lim at the time the estimated power balance is nearly equal to the electric power balance that can be computed from the scheduled electric power transfer amount scheduled_power(k). The steps in FIG. 13 will be described below.

Figure 14:
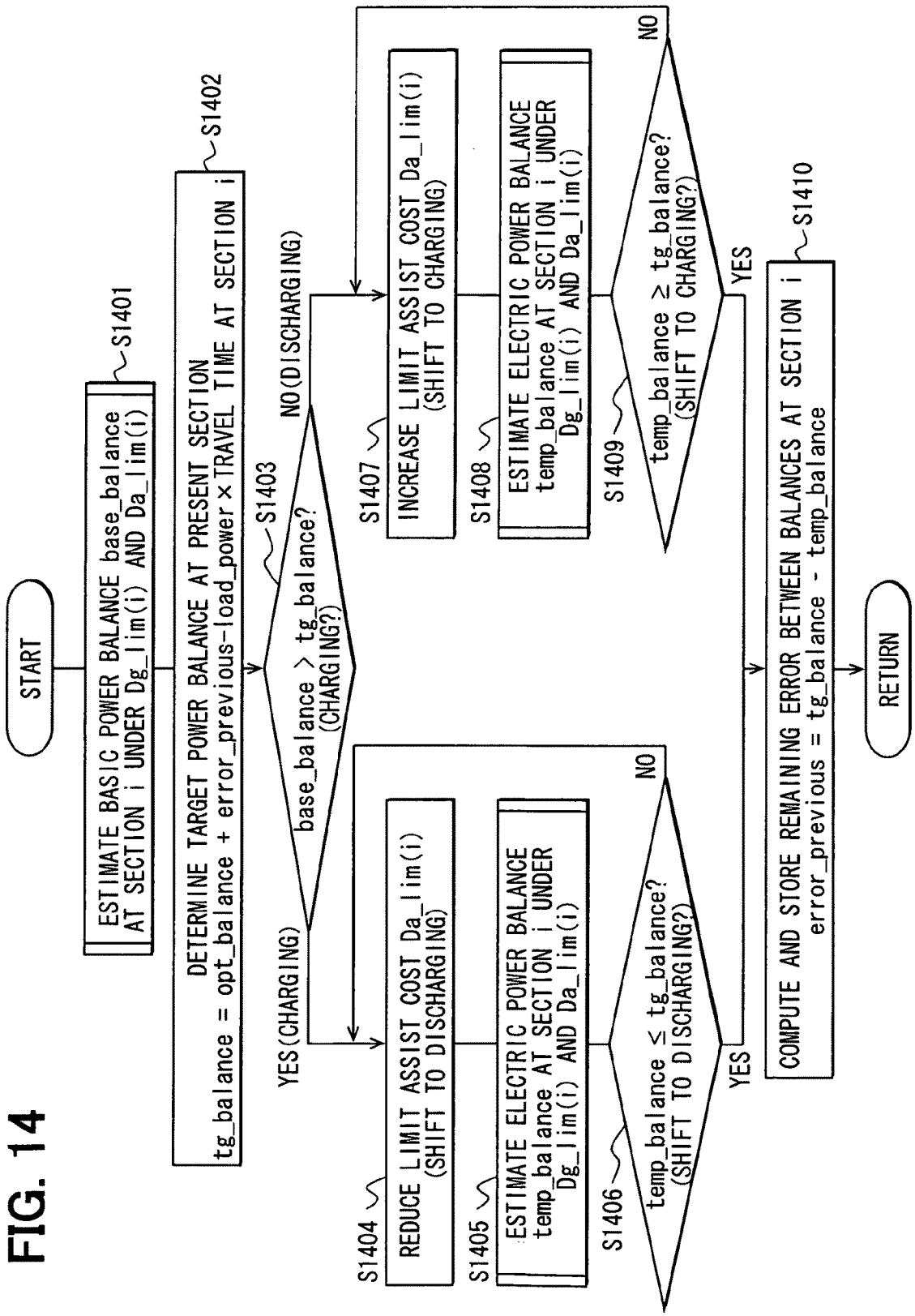
FIG. 14 is a flowchart showing details of step S1306 in FIG. 13.

At step S1301, the controller acquires the scheduled electric power transfer amount scheduled_power(k) determined at step S309. At next step S1302, the controller resets a section counter i at 1, and then resets at 0 the energy error_previous that has not been corrected for the previous section. The energy error_previous will be described later (FIG. 14).

At next step S1303, the controller sets the limit electric power generation cost Dg_lim(i) for each section i. Specifically, the controller first acquires, with reference to the division data, the time section_div(i) of entry into each section i and the time section_div(i+1) of entry into the next section i+1. The controller then acquires, for k including time(k), the scheduled electric power transfer amount scheduled_power (k) determined at step S309. The controller finally sets, as the limit electric power generation cost Dg_lim(i) for the section i, the highest minimum electric power generation cost Dg_min(k) for the acquired scheduled electric power transfer amount scheduled_power(k) larger than 0 (electric power generation is scheduled).

At next step S1304, the controller sets the limit electric assist cost Da_lim(i) for each section i. Specifically, the controller first acquires, with reference to the division data, in the same manner as in previous step S1303, for the time time(k) in each section i, the scheduled electric power transfer amount scheduled_power(k) determined at step S309. The controller then sets, as the limit electric assist cost Da_lim(i) for the section i, the lowest maximum electric assist cost Da_max(k) for the acquired scheduled electric power transfer amount scheduled_power(k) smaller than 0 (assistance is scheduled).

At next step S1305, the controller computes the optimum electric power balance opt_balance at the section i by means of the time quadrature of the scheduled electric power transfer amount scheduled_power(k) at the section i. At next step S1306, the controller so corrects the limit electric assist cost Da_lim(i) for the section i that the electric power balance at the section i is nearly equal to the optimum electric power balance opt_balance computed at step S1305. S1306 will be described later (FIG. 14).

At next step S1307, the controller determines whether the count by the section counter i is equal to the number of second route sections. When the result of the determination is negative (no), the processing proceeds to step S1308, where the controller increments the section counter i. Then, the controller executes step S1303 and the succeeding steps for the next section. When the count is equal to the number of second route sections, this subroutine ends, and the processing proceeds to step S3111 in FIG. 3.

The details of step S1306 in FIG. 13 will be described below with reference to FIG. 14. While the processing shown in FIG. 14 is for estimating the electric power balance at each section i, this processing so corrects the limit electric assist cost Da_lim that this balance is nearly equal to the electric power balance of the scheduled electric power transfer amount scheduled_power(k) (optimum electric power balance).

The method for estimating the electric power balance in FIG. 14 is a computing method similar to a method, which will be described later, for computing the demanded electric power transfer amount Bpwref during the traveling. Specifically, at step S1306 in FIG. 13, the controller first estimates, in advance before the vehicle travels actually, the electric power balance during the actual traveling along each section i. In this step, the controller then sets a limit value at which the estimated power balance approaches the optimum electric power balance opt_balance as much as possible. This step enables the electric power balance during the actual traveling along each section i to approach the optimum electric power balance opt_balance.

With reference to FIG. 14, at first step S1401, the controller estimates the basic electric power balance base_balance at the section i for the limit electric power generation cost Dg_lim(i) and limit electric assist cost Da_lim(i). This step S1401 will be described later with reference to FIG. 15. The basic electric power balance base_balance is an estimated value of the electric power balance during the actual traveling along each section i.

At next step S1402, the controller determines the target electric power balance tg_balance at the section i. The target electric power balance tg_balance is the value remaining after the product of the average electric power consumption load_power computed at step S304 and the traveling time for the section i is subtracted from the sum of the optimum electric power balance opt_balance computed at step S1305 and the energy error_previous that has not been corrected for the previous section i−1. The purpose in adding the energy error_previous is to reduce, over the whole route, the error between the electric power balance during the actual traveling and the calculated electric power balance.

At next step S1403, the controller determines whether the basic electric power balance base_balance estimated at step S1401 is larger than the target electric power balance tg_balance determined at step S1402. The determination determines whether the electric power balance is on the charging side of the target electric power balance.

When the result of the determination at step S1403 is positive (yes), i.e., when the electric power balance is on the charging side, the processing proceeds to step S1404, where the controller reduces the limit electric assist cost Da_lim(i) by a specified value. During the actual traveling, a demanded electric power transfer amount Bpwref is demanded for at least the limit electric assist cost Da_lim(i). Therefore, the reduction of the limit electric assist cost Da_lim(i) enables assistance at a lower electric assist cost. As a result, the estimated electric power balance temp_balance at the section i shifts toward the discharging side.

At next step S1405, the controller estimates, in the same manner as at step S1401, the electric power balance temp_balance at the section i based on the limit electric assist cost Da_lim(i) reduced at step S1404 and the limit, electric power generation cost Dg_lim(i) used at step S1401.

At next step S1406, the controller determines whether the electric power balance temp_balance estimated at step S1405 is larger than the target electric power balance tg_balance determined at step S1402. When the result of the determination is negative (no), the controller repeats steps S1404 to S1406. The repetition reduces the limit electric assist cost Da_lim(i) gradually, so that the electric power balance temp_balance at the section i shifts gradually toward the discharging side. When the result of the determination at step S1406 turns positive (yes), i.e., when the electric power balance is on the discharging side, the processing proceeds to step S1410.

When the result of the determination at step S1403 is negative (no), i.e., when the electric power balance is on the charging side, the processing proceeds to step S1407, where the controller increases the limit electric assist cost Da_lim(i) by a specified value. The increasing restrains assistance, so that the estimated electric power balance temp_balance at the section i shifts toward the charging side.

At next step S1408, the controller estimates, in the same manner as at step S1401, the electric power balance temp_balance at the section i based on the limit electric assist cost Da_lim(i) increased at step S1407 and the limit electric power generation cost Dg_lim(i) used at step S1401.

At next step S1409, the controller determines whether the electric power balance temp_balance estimated at step S1408 is larger than the target electric power balance tg_balance determined at step S1402. When the result of the determination is negative (no), the controller repeats steps S1407 to S1409. The repetition increases the limit electric assist cost Da_lim(i) gradually, so that the electric power balance temp_balance at the section i shifts gradually toward the charging side. When the result of the determination turns positive (yes), i.e., when the electric power balance is on the charging side, the processing proceeds to step S1410. At step S1410, the controller computes the electric power balance that has not been corrected completely and still remains at the section i, i.e. the difference or error between the target electric power balance tg_balance and the electric power balance temp_balance. In this step, the controller then stores the computed difference as the energy error_previous that has not been corrected at the previous section.

Figure 15:
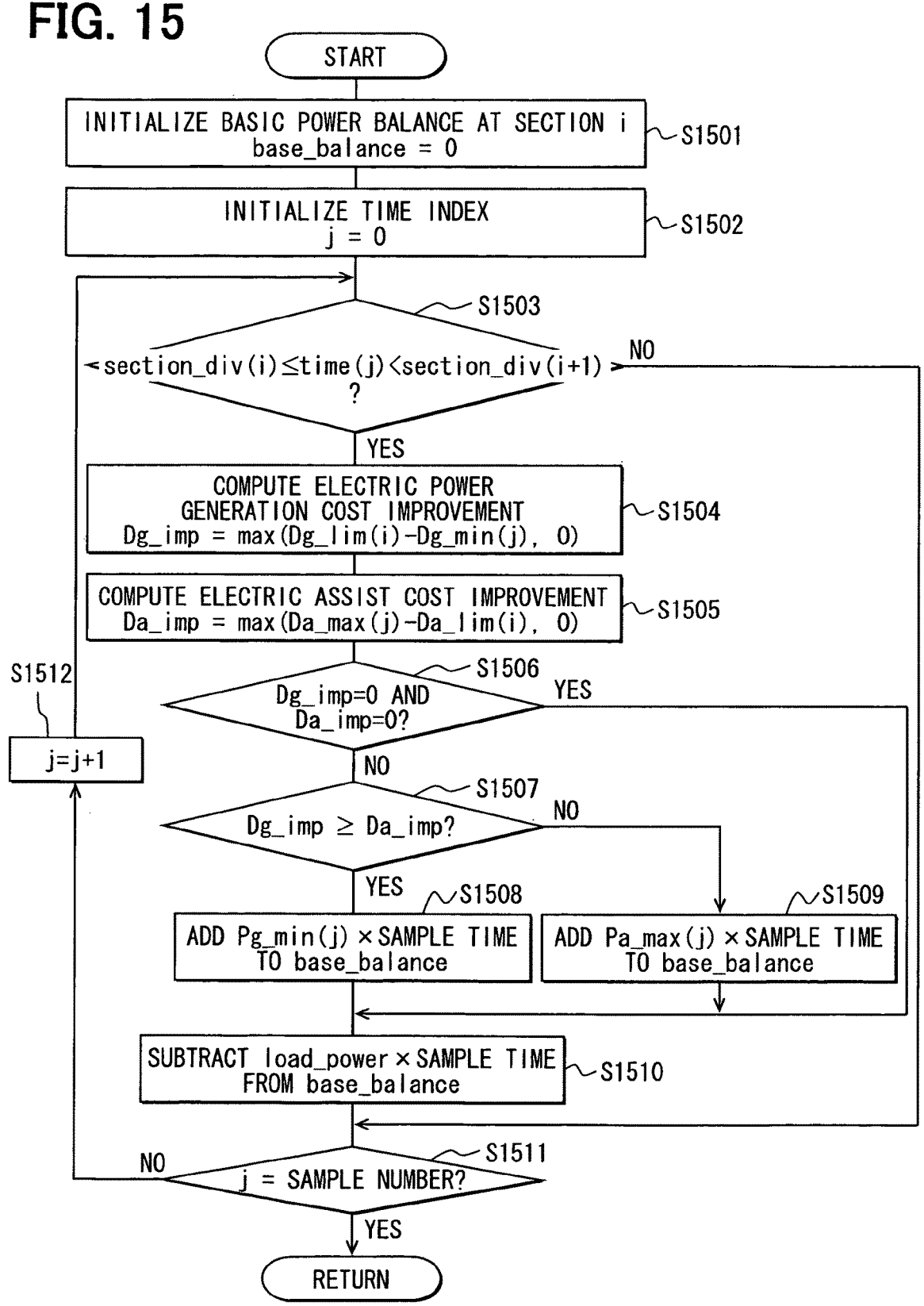
FIG. 15 is a flowchart showing details of step S1401 in FIG. 14.

Step S1401 in FIG. 14 will be described below. FIG. 15 shows the details of step S1401. The processing shown in FIG. 15 estimates the basic electric power balance base_balance at the section i for the limit electric power generation cost Dg_lim(i) and limit electric assist cost Da_lim(i).

First, at step S1501, the controller initializes the basic electric power balance base_balance for the section i to zero. At next step S1502, the controller initializes a time index j at 0. The time index j, which is similar to k, is a natural number representing the number of time steps.

At next step S1503, the controller determines whether section_div(i)≦time(j)<section_div(i+1) is satisfied. The determination determines whether the time index j belongs to the section i. When the result of the determination is negative (no), the controller skips the processing for the time index j and executes step S1511.

When the time index j belongs to the section i (yes), the processing proceeds to S1504, where the controller computes an electric power generation cost improvement amount Dg_imp according to EQ. 5, which will be described below.

$$Dg\_imp = \max(Dg\_lim(i) - Dg\_min(j), 0) \quad [\text{EQ. 5}]$$

Herein, max(x,y) represents a function for whichever of x and y is larger. In EQ. 5, the limit electric power generation cost Dg_lim(i) is the value set at step S1303 in FIG. 13, and the minimum electric power generation cost Dg_min(j) is the value computed at step S307 in FIG. 3. At next step S1505, the controller computes an electric assist cost improvement amount Da_imp according to EQ. 6, which will be described below.

$$Da\_imp = \max(Da\_\max(j) - Da\_lim(j), 0) \quad [\text{EQ. 6}]$$

In EQ. 6, the limit electric assist cost Da_lim(i) is the value set at step S1304 in FIG. 13, and the minimum electric assist cost Da_min(j) is the value computed at step S308 in FIG. 3.

The electric power generation cost improvement amount Dg_imp and the electric assist cost improvement amount Da_imp are the cost improvement amounts achieved by the electric power generation and the traveling in the drive power assist mode respectively. During the actual traveling as well, the controller computes the amounts Dg_imp and Da_imp.

At next step S1506, the controller determines whether both the electric power generation cost improvement amount Dg_imp and the electric assist cost improvement amount Da_imp are zero. When the result of the determination is positive (yes), neither the electric power generation nor the traveling in the drive power assist mode improves the fuel consumption rate. In this case, on the assumption that the demanded electric power transfer amount Bpwref during the actual traveling is zero, the processing proceeds to step S1510, without increasing or decreasing the basic electric power balance base_balance.

When the result of the determination at step S1506 is negative (no), the processing proceeds to step S1507, where the controller determines whether the electric power generation cost improvement amount Dg_imp is equal to or larger than the electric assist cost improvement amount Da_imp. When the controller determines in this step that the amount Dg_imp is equal to or larger than the amount Da_imp (yes), it estimates that electric power be generated at the appropriate time during the actual traveling. In this case, the controller adds, to the basic electric power balance base_balance, the product of the electric power Pg_min(j) at the time the electric power generation cost is lowest and the sample time. Then, the processing proceeds to step S1510.

When the controller determines at step S1507 that the electric power generation cost improvement amount Dg_imp is smaller than the electric assist cost improvement amount Da_imp (no), it estimates that assistance is provided at the appropriate time during the actual traveling. In this case, the controller adds, to the basic electric power balance base_balance, the product of the electric power Pa_max(j) at the time the electric assist cost is highest and the sample time. Then, the processing proceeds to step S1510.

At step S1510, the controller subtracts, from the basic electric power balance base_balance, the product of the average electric power consumption load_power estimated at step S304 and the sample time. The purpose of the subtraction is to reflect, in the electric power balance, the influence of the electric power consumed by the electric loads.

At next step S1511, the controller determines whether the time index j has reached the number of all steps. When the result of the determination is negative (no), the processing proceeds to step S1512, where the controller increments the time index j. Then, the processing returns to step S1503. When the result is positive (yes), the processing returns to the upper level routine, which is shown in FIG. 14.

After the routine shown in FIG. 14 ends, the processing returns to the upper level routine, which is shown in FIG. 13. After the routine shown in FIG. 13 ends, the processing returns to the upper level routine, which is shown in FIG. 3, and the controller executes step S311.

At step S311 in FIG. 3, as described above, the controller stores, in the travel information databases in the navigation unit 29, the pieces of information computed at steps S301 to S310. At next step S312, the controller selects, from the travel information accumulated in this databases, one of the pieces of travel information acquired when the vehicle traveled along each route. In this step, the controller sets, as the planning information for the next traveling, the planning information included in the selected piece of travel information.

step S312 will be described below in detail with reference to FIG. 16. First, at step S1601, the controller computes an average estimated fuel consumption amount est_fuel_ave(i) (i ranges between 1 and n).

The average estimated fuel consumption amount est_fuel_ave(i) is the average fuel consumption amount estimated on the assumption that the vehicle travels along a travel route according to the planning information for the i-th latest traveling along the route, and according to the traveling patterns according to which the vehicle has traveled the number of times n along the route. As shown in FIG. 11, the planning information is the limit electric power generation cost Dg_lim (l) and limit electric assist cost Da_lim(l) (l is a section number). Accordingly, the average estimated fuel consumption amount est_fuel_ave(i) is the average fuel consumption amount estimated on the assumption that the vehicle travels along a travel route with the limit costs Dg_lim(l) and Da_lim (l) for the ith latest traveling along the route, according to the traveling patterns according to which the vehicle has traveled the number of times n along the route. "i" in this processing differs in meaning from the section numbers i. At step S1601, the controller computes the average estimated fuel consumption amount est_fuel_ave(i) for i ranging between 1 and n.

FIG. 17 conceptually shows the method for computing the average estimated fuel consumption amount est_fuel_ave. With reference to FIG. 17, a plan i means the planning information for the i-th latest traveling (traveling i). An estimated fuel consumption amount est_fuel(i,j) is the fuel consumption amount estimated for the traveling according to the plan i and the traveling pattern for past traveling j (j ranges between 1 and n).

Figure 18:
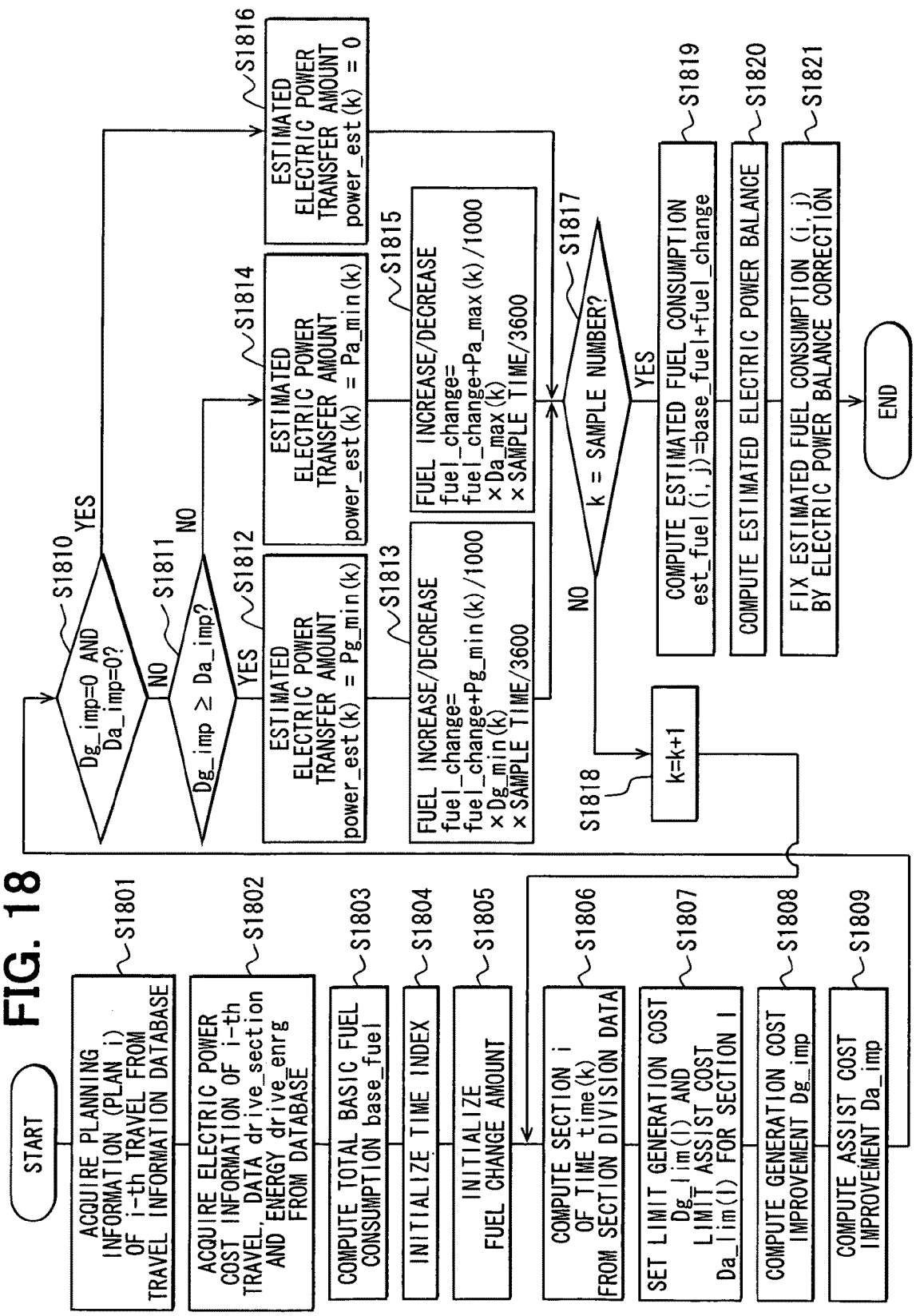
FIG. 18 is a flowchart showing details of computation of an estimated fuel consumption at step S1601 in FIG. 16.

In order to compute the average estimated fuel consumption amount est_fuel_ave, the controller first estimates, for the traveling according to the plan i and the traveling patterns for the j-th latest traveling (traveling j) along each route, the fuel consumption amount est_fuel_ave(i,j) for each of the patterns for i and j ranging between 1 and n ($n^2$ patterns). The method for estimating the fuel consumption will be described later (FIG. 18).

Then, the controller computes the average estimated fuel consumption amount est_fuel_ave(i) in the plan i by averaging the estimated fuel consumptions est_fuel_ave(i,1) to est_fuel_ave(i,n).

After computing the average estimated fuel consumption amount est_fuel_ave(i) at step S1601, the processing proceeds to step S1602, where the controller computes i for the minimum consumption est_fuel_ave(i), reads out, from the travel information database, the limit electric power generation cost Dg_lim(l) and limit electric assist cost Da_lim(l)

that are the planning information for the i-th latest traveling, and then sets the limit costs Dg_lim(l) and Da_lim(l) as the limit electric power generation cost Dg_lim_next(l) and limit electric assist cost Da_lim_next(l) respectively for the next traveling.

With reference to FIG. 18, the method for computing the estimated fuel consumption amount est_fuel_ave(i,j) will be described below. First, at step S1801, the controller acquires the planning information (plan i) for the traveling i from the travel information database. At next step S1802, the controller acquires the electric cost information, division data section_div(l) and total traveling energy drive_enrg for the traveling j from the travel information database.

At next step S1803, the controller computes a total basic fuel consumption amount base_fuel [g] from the basic fuel consumption amount base_fuelrate(k) [g/h] that is a datum in the cost information for the traveling j. The total basic fuel consumption is the total fuel consumption for the traveling j without electric power transfer. The total basic fuel consumption amount base_fuel is the sum of base_fuelrate(k) [g/h]× sample time [s]/3600 at all times for the traveling j, as defined below by EQ. 7, where DATA_NUM represents a sample number.

$$\text{base\_fuel} = \sum_{k=1}^{DATA\_NUM} \text{base\_fuelrate}(k) \times \text{sampling time}/3600 \quad \text{[EQ. 7]}$$

At next step S1804, the controller initializes the time index k to 1. At step S1805, the controller initializes a fuel increas/decrease amount fuel_change [g] to 0. The fuel increas/decrease amount fuel_change is the fuel consumption that varies with the determination on the electric power transfer amount between the rotary electric machine and the electric power supply system with the plan i relative to the fuel consumption (basic fuel consumption amount base_fuel) for the traveling j without electric power transfer. The positive value fuel_change is defined as a fuel increase.

At next step S1806, the controller, computes, from the division data section_div(l), the section l associated with the time(k). At next step S1807, the controller sets, from the plan i, the limit electric power generation cost Dg_lim(l) and limit electric assist cost Da_lim(l) in the plan i for the section l.

At next step S1808, the controller computes the electric power generation cost improvement amount Dg_imp at the present time step k according to EQ. 8, which will be described below. At step S1809, the controller computes the electric assist cost improvement amount Da_imp at the present time step k according to EQ. 9, which will be described below.

$$Dg\_imp = \max(Dg\_lim(l) - Dg\_min(k), 0) \quad \text{[EQ. 8]}$$

$$Da\_imp = \max(Da\_max(l) - Da\_lim(k), 0) \quad \text{[EQ. 9]}$$

At next step S1810, the controller determines whether the electric power generation cost improvement amount Dg_imp and the electric assist cost improvement amount Da_imp are both 0. When the result of the determination is positive (yes), the controller estimates that the estimated electric power transfer amount powe_est(k) at the present time step k is 0, and the controller sets to 0 the estimated amount power_est(k) at the time step k. Then, the processing proceeds to step S1817.

When the result of the determination is negative. (no), the controller estimates that electric power generation or assistance be provided. In this case, the processing proceeds to step S1811, where the controller determines whether the electric power generation cost improvement amount Dg_imp is equal to or larger than the electric assist cost improvement amount Da_imp. When the result of the determination is positive (yes), the controller estimates that electric power be generated at the present time step k. In this case, the processing proceeds to step S1812, where the controller sets the electric power transfer amount power_est(k) at this time step as the electric power transfer amount Pg_min(k) at the time the electric power generation cost is lowest.

At next step S1813, the controller adds, to the fuel increas/decrease amount fuel_change, the increase in fuel consumption (Pg_min(k) [W]/1000×Dg_min(k) [g/kWh]×sample time [s]/3600) that is caused by the electric power generation at the time step k. Then, the processing proceeds to step S1817.

When the result of the determination at step S1811 is negative (no), the controller estimates that assistance be provided at the present time step k. In this case, the processing proceeds to step S1814, where the controller sets the electric power transfer amount power_est(k) at this time step as the electric power transfer amount Pa_max(k) at the time the electric assist cost is lowest. At next step S1815, the controller adds, to the fuel increas/decrease amount fuel_change, the decrease in fuel consumption (Pa_max(k) [W]/1000× Da_max(k) [g/kWh]×sample time [s]/3600) that is caused by the assistance at the time step k (substantially, the addition is subtraction because Pa_max(k) is negative). Then, the processing proceeds to step S1817.

At step S1817, the controller determines whether the number k has reached the number of all samples for the traveling j. When the result of the determination is negative (no), the processing proceeds to step S1818, where the controller increments the number k. Then, the processing returns to step S1806, where the controller proceeds to the next time step k. When the result of the determination at step S1817 is positive (yes), the processing proceeds to step S1819, where the controller computes the estimated fuel consumption amount est_fuel(i,j) by adding the total basic fuel consumption amount base_fuel computed at step S1803 and the fuel increas/decrease amount fuel_change together.

At next step S1820, the controller computes the estimated electric power balance est_balance[J] on the assumption that the plan j has been used for the traveling i. As defined by EQ. 10, which will be described below, the controller computes this estimated electric power balance est_balance by totaling the products of the estimated electric power transfer amount power_est(k) and the sample time at all time steps k and subtracting, from the total value, the total electric load energy consumption load_enrg computed at step S304.

$$\text{est\_balance} = \sum_{k=1}^{DATA\_NUM} \text{power\_est}(k) \times \text{sampling time} - \text{load\_enrg} \quad \text{[EQ. 10]}$$

At next step S1821, the controller makes an electric power balance correction to the estimated fuel consumption amount est_fuel(i,j) with the estimated electric power balance est_balance computed at step S1820 and then defines this consumption.

The electric power balance correction is the correction of the estimated fuel consumption amount computed at step S1819 to the amount of fuel consumed on the assumption that the electric power balance during the traveling is zero. The reason for making an electric power balance correction is that the fuel consumption by a hybrid vehicle also changes due to the difference between the amount of electric energy accumulated by the battery of the vehicle before the vehicle travels and the amount of electric energy accumulated by the battery after the vehicle travels. Specifically, when the electric power balance of the battery is positive (an increase) before and after the traveling, the fuel consumption increases by the amount of generation of the increase in electric energy. When the battery power balance is negative (a decrease) before and after the traveling, the decrease in electric energy is used for engine assistance or motor traveling, so that the fuel consumption decreases.

The method of electric power balance correction will be described below. When the estimated electric power balance est_balance computed at step S1820 is positive (an increase), and when the electric power balance becomes zero, the controller corrects, on the assumption that it is possible to reduce the drive energy by the increase in electric energy, the estimated fuel consumption toward the decrease side according to EQ. 11, which will be described below.

$$\text{est\_fuel}(i,j) \text{ (corrected)} = \text{est\_fuel}(i,j) \text{ (not corrected)} - \text{est\_balance} \times \alpha \times \text{est\_fuel}(i,j) \text{ (not corrected)} / \text{drive\_enrg} \quad [\text{EQ. 11}]$$

In the second term of the right side of EQ. 11, "est_balance×α" is the drive energy that can be generated by the increase in electric energy, and α represents an efficiency of conversion from electric energy to drive energy. α is an average value found experimentally in advance from conversion efficiencies in various traveling modes. In the second term of the right side, "est_fuel(i,j) (not corrected)/drive_enrg" represents the fuel consumption amount required per section drive energy. drive_enrg is the value acquired from the travel information database at step S1802.

Therefore, because the second term of the right side of EQ. 11 is the product of the drive energy that can be generated by the increase in electric energy and the fuel consumption amount required for the generation of section drive energy, this term represents the decrease in fuel consumption amount that can be caused by the increase in electric energy. In this equation, the subtraction of the second term of the right side from the fuel consumption amount est_fuel(i,j) (not corrected) that has not been corrected causes the fuel consumption amount est_fuel(i,j) (corrected) for zero electric power balance to be estimated.

When the electric power balance est_balance estimated at step S1820 is negative (a decrease), and when the electric power balance becomes zero, the controller corrects, on the assumption that it is necessary to generate electric power by the decrease in electric energy, the estimated fuel consumption amount toward the increase side according to EQ. 12, which will be described below.

$$\text{est\_fuel}(i,j) \text{ (corrected)} = \text{est\_fuel}(i,j) \text{ (not corrected)} - \text{est\_balance}/\alpha \times \text{est\_fuel}(i,j) \text{ (not corrected)} / \text{drive\_enrg} \quad [\text{EQ. 12}]$$

In the second term of the right side of EQ. 12, "est_balance/α" is the drive energy required for the generation of the decrease in electric energy, and α is the same as in the case where est_balance is positive. In the second term of the right side, "est_fuel(i,j) (not corrected)/drive_enrg" is the same as in the case where est_balance is positive. Therefore, because the second term of the right side is the product of the drive energy required for the generation of the decrease in electric energy and the fuel consumption amount required for the generation of section drive energy, this term represents the fuel consumption amount required for the generation of the decrease in electric energy. The controller adds the required fuel consumption amount to the fuel consumption amount that has not been corrected. Although the second member of the right side follows a negative sign, this side is substantial addition because est_balance is negative. Thus, it is possible to define the estimated fuel consumption amount est_fuel(i,j) for zero electric power balance.

By executing the processing shown in FIG. 18 for all combinations (i,j), it is possible to define the table shown in FIG. 17, except for the column for "AVERAGE". As described above, the controller computes the average estimated fuel consumption amount est_fuel_ave(i) in the plan i by averaging the estimated fuel consumption amounts est_fuel(i,1) to est_fuel(i,n). Subsequently, at step S1602 in FIG. 16, the controller determines the limit electric power generation cost Dg_lim_next(l) and limit electric assist cost Da_lim_next(l) for the next traveling.

The foregoing is the processing that the controller executes before the vehicle travels. While the vehicle is traveling, the controller repeats step S313 in FIG. 3. At step S313, as described above, the controller first sets, from the planning information, which is the limit electric power generation cost Dg_lim_next(l) and limit electric assist cost Da_lim_next(l), selected at step S312, the limit generating and electric assist costs associated with the section along which the vehicle is traveling, as the present limit electric power generation cost Dg_lim_pres and present limit electric assist cost Da_lim_pres respectively, and transmits the present limit costs to the hybrid control ECU 24.

The hybrid control ECU 24 computes the demanded electric power transfer amount Bpwref based on the present limit electric power generation cost Dg_lim_pres and present limit electric assist cost Da_lim_pres (step S202 in FIG. 2).

Figure 19:
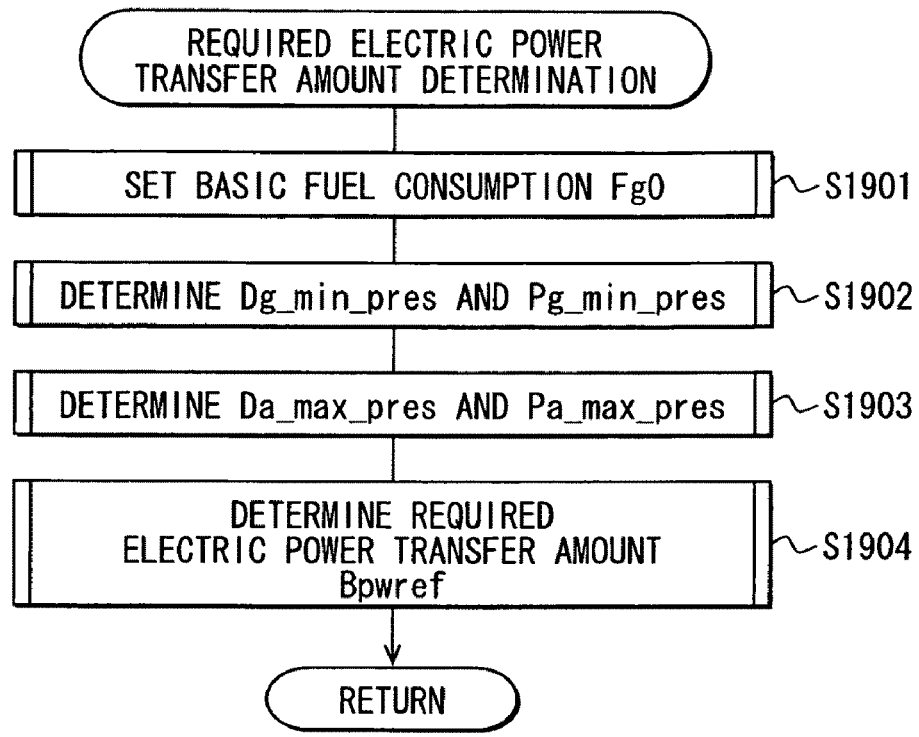
FIG. 19 is a flowchart showing details of step S202 in FIG. 2.

The computation of the demanded electric power transfer amount Bpwref will be described below with reference to FIG. 19. With reference to FIG. 19, at first step S1901, the hybrid control ECU 24 sets the basic fuel consumption amount Fg0 at a particular point of time. This step is the same as step S305 in FIG. 3 except that, in this step, the ECU 24 uses, instead of the traveling load P(k) set at step S304 in FIG. 3, the demanded drive power SPw set at step S201 in FIG. 2.

At next step S1902, which corresponds to an actual electric power generation cost computing section, the hybrid control ECU 24 determines the present electric power generation cost Dg_pres[i], the present minimum electric power generation cost Dg_min_pres, and the electric power Pg_min_pres at the time the present electric power generation cost is lowest. At step S1903, which corresponds to an actual electric assist cost computing section, the ECU 24 determines the present electric assist cost Da_pres[i], the present maximum electric assist cost Da_max_pres, and the electric power Pa_max_pres at the time the present electric power generation cost is highest. These steps S1902 and S1903 are the same as steps S307 and S308 respectively in FIG. 3. However, at S1902 and S1903, the ECU 24 uses, as the electric power consumption in the electric power supply system, the electric power consumption computed based on the current and voltage at the in-system power supply line 19 that have been detected by the electric power detector 28, and also uses, instead of the traveling load P(k) set at step S304, the demanded drive power SPw set at step S201 in FIG. 2.

Figure 20:
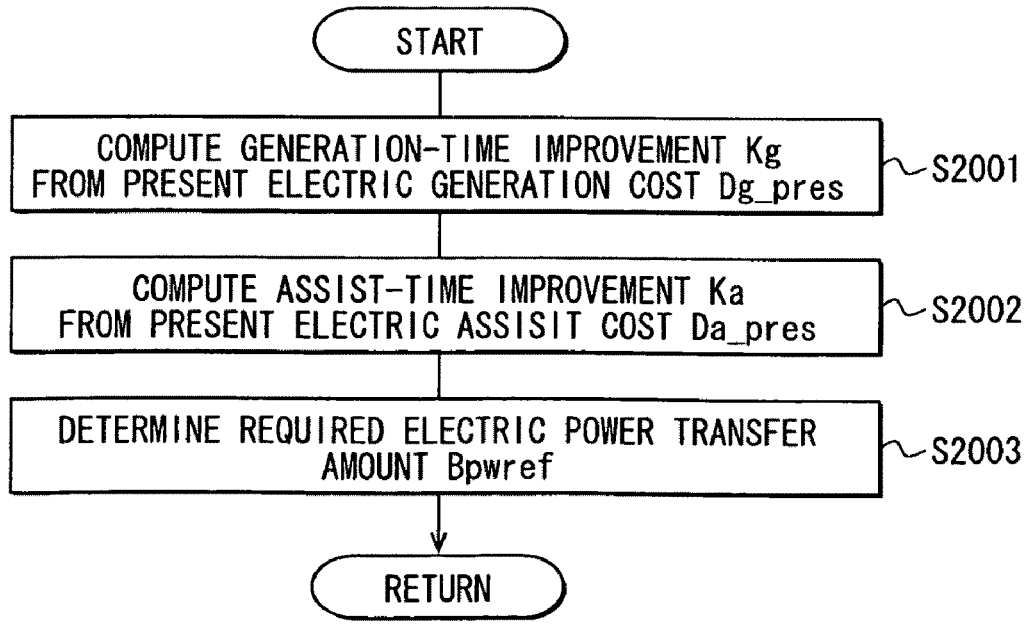
FIG. 20 is a flowchart showing details of step S1904 in FIG. 19.

At next step S1904, the hybrid control ECU 24 computes the demanded electric power transfer amount Bpwref. This step will be described with reference to FIG. 20.

At first step S2001, the hybrid control ECU 24 computes an improvement amount Kg during electric power generation, which is the cost improvement amount for the present minimum electric power generation cost Dg_min_pres, by subtracting, from the present limit electric power generation cost Dg_lim_pres transmitted from the navigation unit 29, the present minimum electric power generation cost Dg_min_pres.

At next step S2002, the hybrid control ECU 24 computes an improvement amount Ka during assistance, which is the cost improvement amount for the present maximum electric assist cost Da_max_pres, by subtracting, from the present maximum electric assist cost Da_max_pres set at step S1903, the present limit electric assist cost Da_lim_pres transmitted from the navigation unit 29.

At next step S2003, the hybrid control ECU 24 determines the demanded electric power transfer amount Bpwref based on the values set at steps S2001 and S2002. The method for determining this amount Bpwref will be described with reference to FIGS. 21 to 23.

Figure 21:
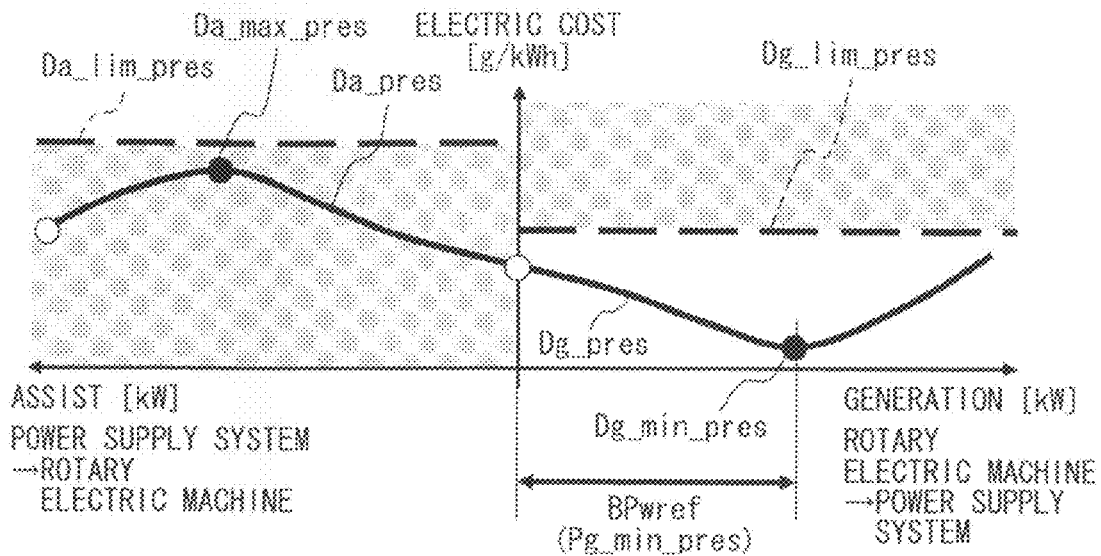
FIG. 21 is a graph showing a specific example of processing shown in FIG. 20.

FIG. 21 shows a case where the present minimum electric power generation cost Dg_min_pres and present maximum electric assist cost Da_max_pres are lower than the present limit electric power generation cost Dg_lim_pres and present limit electric assist cost Da_lim_pres respectively.

For electric power generation, the fuel consumption rate is improved more effectively when the minimum value is lower than the limit value. For the traveling in the drive power assist mode, the fuel consumption rate is improved more effectively when the maximum value is higher than the limit value. Therefore, in the case shown in FIG. 21, the hybrid control ECU 24 determines, as the demanded electric power transfer amount Bpwref, the electric power equivalent to the present minimum electric power generation cost Dg_min_pres, i.e., the electric power Pg_min_pre at the time the present electric power generation cost is lowest.

Figure 22:
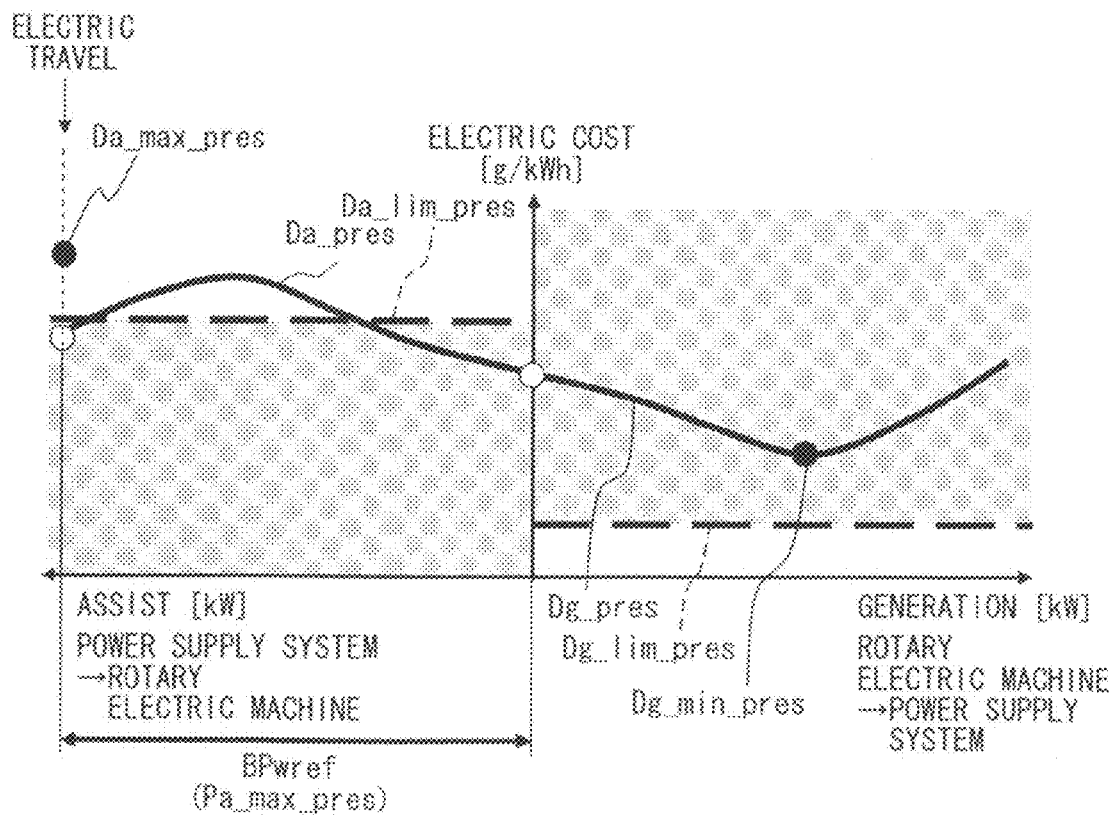
FIG. 22 is a graph showing another specific example of the processing shown in FIG. 20.

FIG. 22 shows a case where the present minimum electric power generation cost Dg_min_pres and present maximum electric assist cost Da_max_pres are higher than the present limit electric power generation cost Dg_lim_pres and present limit electric assist cost Da_lim_pres respectively. Therefore, in the case shown in FIG. 22, the hybrid control ECU 24 determines, as the demanded electric power transfer amount Bpwref, the electric power equivalent to the present maximum electric assist cost Dg_min_pres, i.e., the electric power Pg_min_pres at the time the present electric assist cost is highest.

Figure 23:
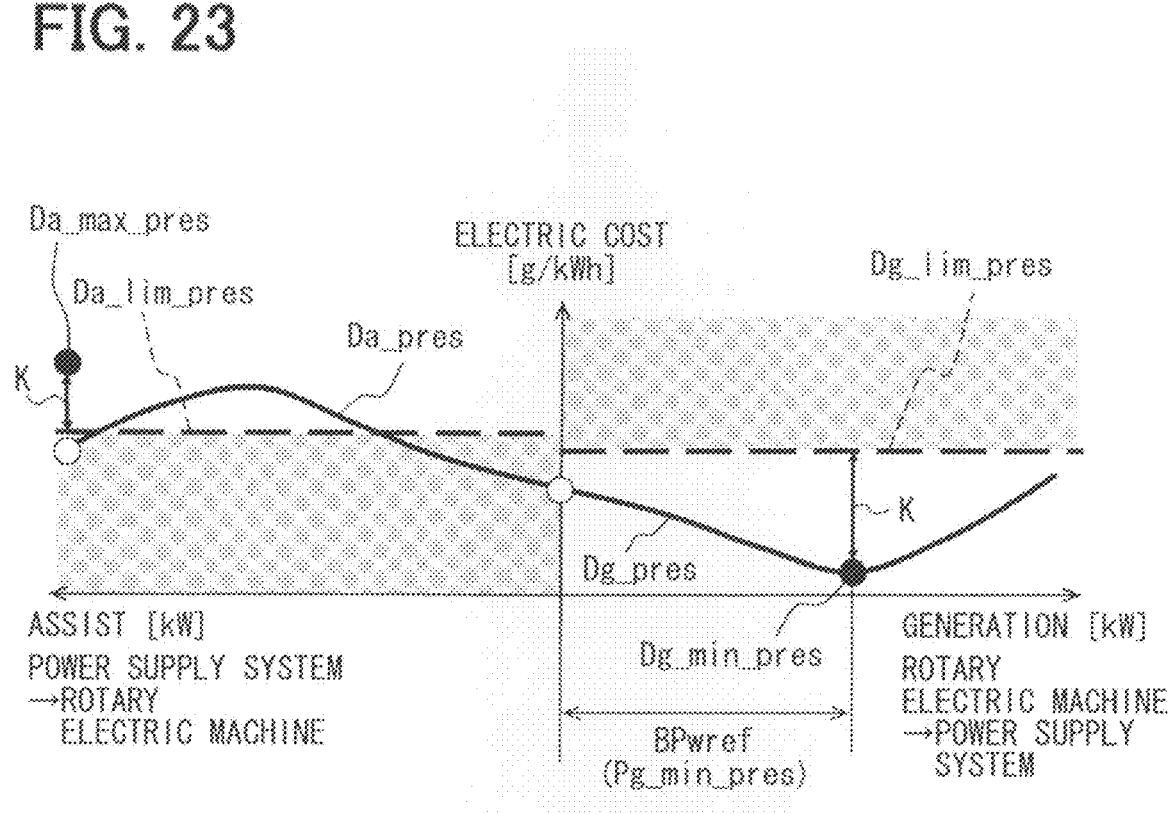
FIG. 23 is a graph showing still another specific example of the processing shown in FIG. 20.

FIG. 23 shows a case where the present minimum electric power generation cost Dg_min_pres is lower than the present limit electric power generation cost Dg_lim_pres, and where the present maximum electric assist cost Da_max_pres is higher than the present limit electric assist cost Da_lim_pres. In this case, either assistance or electric power generation is effective in improving the fuel consumption rate. In this case, the hybrid control ECU 24 compares the improvement amount Kg during electric power generation computed at step S2001 and the improvement amount Ka during assistance computed at step S2002. Then, the ECU 24 selects whichever of the amounts Kg and Ka is larger. The result of the comparison of the improvement amounts K is that the improvement amount Kg during electric power generation is larger. Therefore, the ECU 24 determines, as the demanded electric power transfer amount Bpwref, the electric power equivalent to the present minimum electric power generation cost Dg_min_pres, i.e., the electric power Pg_min_pres at the time the present electric power generation cost is lowest.

When the present minimum electric power generation cost Dg_min_pres is higher than the present limit electric power generation cost Dg_lim_pres, and when the present maximum electric assist cost Dg_min_pres is lower than the present limit electric assist cost Da_lim_pres, neither assistance nor electric power generation is effective in improving the fuel consumption rate. In this case, the hybrid control ECU 24 determines the demanded electric power transfer amount Bpwref as zero.

After determining the demanded electric power transfer amount Bpwref, the hybrid control ECU 24 executes step S203 and the succeeding steps in FIG. 2 to output, to the engine control ECU 26 and MG control ECU 20, the signals for controlling the engine 4 and motor/generators MG1 and MG2.

In this embodiment, the limit electric power generation cost Dg_lim(l) and limit electric assist cost Da_lim(l) are set based on the electric power generation cost Dg and electric assist cost Da computed based on the traveling load P(k) predicted when the vehicle travels along the proposed travel route. For the next traveling, the limit electric power generation cost Dg_lim_next(l) and limit electric assist cost Da_lim_next(l) are selected from the stored limit electric power generation costs Dg_lim(l) and limit electric assist costs Da_lim(l). The present electric power generation cost Dg_pres and present electric assist cost Da_pres are computed based on the drive power Spw required actually while the vehicle is traveling. The improvement amount Kg during electric power generation and the improvement amount Ka during assistance are computed based on the selected limit costs Dg_lim_next(l) and Da_lim_next(l) and the computed present costs Dg_pres and Da_pres. The engine 4 and motor/generators MG are controlled based on the two computed improvement amounts K. This makes the traveling in the electric power generation and assist modes proper or suitable in time point, so that the fuel consumption rate of the hybrid vehicle 1 is improved.

The past limit electric power generation costs Dg_lim and past limit electric assist costs Da_lim are stored as pieces of planning information, each of which is used for the estimation of fuel consumption amount est_fuel on the assumption that the vehicle travels according to the associated past traveling pattern. The fuel consumption amounts est_fuel estimated for the past traveling patterns are averaged as the average estimated fuel consumption amount est_fuel_ave. The piece of planning information for the smallest average estimated fuel consumption amount est_fuel_ave is selected as the planning information for the next traveling. This makes it possible to further improve the fuel consumption rate even when the vehicle speed and the drive power vary conspicuously when the vehicle travels at different times.

The scheduled electric power transfer amount scheduled_power(k) is so determined for each time time(k) that the fuel consumption amount is minimum when the vehicle travels along the proposed travel route. The optimum electric power balance opt_balance for each section i is computed from the scheduled electric power transfer amount scheduled_power(k). By means of control with the limit electric power generation cost Dg_lim(i) and limit electric assist cost Da_lim(i), the electric power transfer amount for each time time(k) is estimated on the assumption that the vehicle travels along the proposed travel route. The estimated electric power balance temp_balance for each section i is computed from the estimated electric power transfer amount as well. The limit electric power generation cost Dg_lim and limit electric assist cost Da_lim are so corrected that the optimum electric power balance opt_balance and the estimated electric power balance temp_balance are nearly equal to each other. As a result, the fuel consumption rate during the actual traveling can be more approximate to the minimum fuel consumption rate.

The present invention is not limited to the foregoing embodiment but can be embodied in various forms.

What is claimed is:

1. A drive power generation control apparatus for a hybrid vehicle having a drive shaft, the vehicle having an internal combustion engine and a rotary electric machine as drive power generators for generating drive power for driving the drive shaft, the vehicle further having a charge storage device for supplying electric power to and receiving electric power from the rotary electric machine, the control apparatus being adapted to control the drive power generators, the control apparatus comprising:

a proposed travel route information setting section for setting a proposed travel route for the vehicle and a predicted drive power required for traveling along the route;

a route dividing section for dividing the set route into a plurality of first sections;

an electric power generation cost computing section for computing an electric power generation cost, for each of the first sections, as an index of a fuel increase caused by electric power generation when the vehicle travels in an electric power generation mode;

an electric assist cost computing section for computing an electric assist cost, for each of the first sections, as an index of a fuel decrease caused by assistance from the rotary electric machine when the vehicle travels in a drive power assist mode;

a reference value setting section for setting, based on the electric power generation cost and the electric assist cost computed for the first sections, an electric power generation cost reference value and an electric assist cost reference value respectively as references for the electric power generation cost and the electric assist cost respectively;

an actual demanded drive power setting section for sequentially setting, as actual demanded drive power, the drive power demanded by the drive shaft while the vehicle is traveling;

an actual electric power generation cost computing section for computing, as an actual electric power generation cost, the electric power generation cost required when the vehicle travels in the electric power generation mode so that the actual demanded drive power is satisfied;

an actual electric assist cost computing section for computing, as an actual electric assist cost, the electric assist cost required when the vehicle travels in the drive power assist mode so that the actual demanded drive power is satisfied;

a control section for determining, from the actual electric power generation cost and the electric power generation cost reference value, a cost improvement amount achieved when the vehicle travels in the electric power generation mode, also determining, from the actual electric assist cost and the electric assist cost reference value, a cost improvement amount achieved when the vehicle travels in the drive power assist mode, controlling, based on two cost improvement amounts, the drive power generated by the internal combustion engine, and also controlling rotation of or electric power generation by the rotary electric machine;

a planning information storing section for storing, as pieces of planning information, past electric power generation cost reference values and electric assist cost reference values set by the reference value setting section;

a performance index computing section for computing a performance index of the fuel consumption amount estimated on an assumption that the vehicle travels along the proposed travel route, with the internal combustion engine and the rotary electric machine controlled based on each of the pieces of planning information stored about the route; and a planning information selecting section for selecting, based on the computed performance index, the piece of planning information including the fuel consumption amount estimated to be lowest, from the pieces of planning information stored about the proposed travel route, wherein the control section is configured to perform control operation thereof by using the electric power generation cost reference value and the electric assist cost reference value as parts of the selected piece of planning information.

2. The drive power generation control apparatus of claim 1, wherein the reference value setting section is configured to:

divide the proposed travel route into a plurality of second sections, each of which is longer than the first section;

set the electric power generation cost reference value for each of the second sections based on the electric power generation costs computed for the first sections included in each of the second section; and set the electric assist cost reference value for each of the second sections based on the electric assist costs computed for the first sections included in each of the second section.

3. The drive power generation control apparatus of claim 2, further comprising:

an optimum electric power transfer amount determining section for determining, based on the electric power generation cost and the electric assist cost computed for each of the first sections, an optimum electric power transfer amount between the rotary electric machine and the charge storage device in each of the first sections to minimize the fuel consumption when the vehicle travels along the proposed travel route;

an optimum electric power balance computing section for computing, based on the optimum electric power transfer amount, an electric power balance for each of the second sections as an optimum electric power balance;

an electric power transfer amount estimating section for determining, from the electric power generation cost computed for each of the first sections and the electric power generation cost reference value, an electric power improvement amount achieved when the vehicle travels in the electric power generation mode, also determining, from the electric assist cost computed for each of the first sections and the electric assist cost reference value, an electric power improvement amount achieved when the vehicle travels in the drive power assist mode, and estimating, based on two electric power improvement amounts, an electric power transfer amount for each of the first sections on the assumption that the vehicle travels along the proposed travel route; and an estimated electric power balance computing section for computing, based on the estimated electric power transfer amount, an electric power balance for each of the second sections as an estimated electric power balance, wherein the reference value setting section is configured to set the electric power generation cost reference value and the electric assist cost reference value so that the optimum and estimated electric power balances computed for each of the second sections are nearly equal.

4. The drive power generation control apparatus of claim 1, further comprising:
- a cost information storing section for storing pieces of cost information including the electric power generation cost and the electric assist cost computed for each of the first sections when the vehicle traveled a plurality of times along the proposed travel route; and
- an estimated fuel consumption computing section for computing, for the stored pieces of cost information, fuel consumption amounts estimated when the vehicle travels according to the pieces of cost information and the stored pieces of planning information,
- wherein the performance index computing section is configured to compute, as the performance index, an average estimated fuel consumption amount, which is the average value of the fuel consumption amounts estimated for the pieces of cost information.

5. The drive power generation control apparatus of claim 4, further comprising:
- an estimated electric power balance computing section for computing, for the stored pieces of cost information, estimated electric power balances between a time when the vehicle starts traveling according to the stored pieces of planning information and cost information and a time when the vehicle stops traveling according to the stored pieces of planning information and cost information,
- wherein the estimated fuel consumption computing section is configured to correct, based on the estimated electric power balances computed by the estimated electric power balance computing section, to the estimated fuel consumption amount at a specified electric power balance, the fuel consumption amount estimated when the vehicle travels according to the stored pieces of planning information and cost information.

6. The drive power generation control apparatus of claim 2, further comprising:
- a cost information storing section for storing pieces of cost information including the electric power generation cost and the electric assist cost computed for each of the first sections when the vehicle traveled a plurality of times along the proposed travel route; and
- an estimated fuel consumption computing section for computing, for the stored pieces of cost information, fuel consumption amounts estimated when the vehicle travels according to the pieces of cost information and the stored pieces of planning information,
- wherein the performance index computing section is configured to compute, as the performance index, an average estimated fuel consumption amount, which is the average value of the fuel consumption amounts estimated for the pieces of cost information.

7. The drive power generation control apparatus of claim 3, further comprising:
- a cost information storing section for storing pieces of cost information including the electric power generation cost and the electric assist cost computed for each of the first sections when the vehicle traveled a plurality of times along the proposed travel route; and
- an estimated fuel consumption computing section for computing, for the stored pieces of cost information, fuel consumption amounts estimated when the vehicle travels according to the pieces of cost information and the stored pieces of planning information,
- wherein the performance index computing section is configured to compute, as the performance index, an average estimated fuel consumption amount, which is the average value of the fuel consumption amounts estimated for the pieces of cost information.

* * * * *